(12) United States Patent
Face

(10) Patent No.: US 7,161,276 B2
(45) Date of Patent: Jan. 9, 2007

(54) SELF-POWERED, ELECTRONIC KEYED, MULTIFUNCTION SWITCHING SYSTEM

(75) Inventor: Bradbury R. Face, Norfolk, VA (US)

(73) Assignee: Face International Corp., Norfolk, VA (US)

( * ) Notice: Subject to any disclaimer, the term of this patent is extended or adjusted under 35 U.S.C. 154(b) by 0 days.

(21) Appl. No.: 10/972,803

(22) Filed: Oct. 25, 2004

(65) Prior Publication Data

US 2005/0168108 A1 Aug. 4, 2005

Related U.S. Application Data

(60) Provisional application No. 60/514,386, filed on Oct. 24, 2003.

(51) Int. Cl.
*H02N 2/00* (2006.01)
*H01L 41/113* (2006.01)

(52) U.S. Cl. ............... 310/314; 310/318; 310/330; 341/22; 341/176

(58) Field of Classification Search ........... 310/314, 310/318, 330; 341/22, 176
See application file for complete search history.

(56) References Cited

U.S. PATENT DOCUMENTS

| | | | | | |
|---|---|---|---|---|---|
| 6,124,678 | A | * | 9/2000 | Bishop et al. | 315/209 PZ |
| 6,127,771 | A | * | 10/2000 | Boyd et al. | 310/359 |
| 6,278,625 | B1 | * | 8/2001 | Boyd | 363/132 |
| 6,630,894 | B1 | * | 10/2003 | Boyd et al. | 341/22 |
| 2003/0048037 | A1 | * | 3/2003 | Boyd | 310/318 |
| 2003/0094856 | A1 | * | 5/2003 | Face et al. | 307/116 |
| 2003/0193417 | A1 | * | 10/2003 | Face et al. | 341/22 |
| 2004/0124741 | A1 | * | 7/2004 | Morrison et al. | 310/314 |

* cited by examiner

*Primary Examiner*—Tom Dougherty
*Assistant Examiner*—J. Aguirrechea
(74) *Attorney, Agent, or Firm*—David J. Bolduc

(57) ABSTRACT

A self-powered switching system using electromechanical generators generates power for activation of a latching relay, switch, solenoid or latch pin. The electromechanical generators comprise electroactive elements that may be mechanically actuated to generate electrical power. The associated signal generation circuitry may be coupled to a transmitter for sending RF signals to a receiver which actuates the latching relay. The use of mechanically activated membrane switches on the deflector or on a keypad allows multiple code sequences to be generated for activating electrical appliances or an electromechanical locking system.

14 Claims, 12 Drawing Sheets

SELF-POWERED, ELECTRONIC KEYED, MULTIFUNCTION SWITCHING SYSTEM

This application claims the benefit of priority under 35 U.S.C. 119(e) from U.S. Provisional Application 60/514,386 filed on Oct. 24, 2003.

BACKGROUND OF THE INVENTION

1. Field of the Invention

The present invention relates to an electronically coded switching system, such as may be used for a light or electrical appliance, mechanical door lock and the like. More particularly, the present invention relates to a self-powered electronic keypad device that generates one or more activation signals for a switch. Electrical power is generated by simultaneously deforming a piezoelectric element while pressing individual buttons and/or entering a code on an electronic keypad. When the correct code is entered, the electrical power may then be used to directly or through and RF transmitter-receiver pair to actuate a device, such as a solenoid or key pin to engage and disengage the lock, or perform some other command function.

2. Description of the Prior Art

Electronically coded mechanical switching systems are known in the prior art. In an electronically coded system, the operator punches a coded sequence of electrically readable buttons. When the proper sequence of buttons is entered, (as read by the system's circuitry), the circuitry actuates switch, such as an electrical or electromechanical positioner (e.g., a solenoid or relay).

Mechanical locking systems are also known in the prior art. In the prior art the locking systems comprise, basically, a mechanical dead bolt by which, when engaged, a door may be locked and by which, when disengaged, a door may be unlocked. Engagement and disengagement of the deadbolt may be controlled by a small releasable pin, which typically moves 0.050 inches (or less) from fully engaged to fully released positions. In an electronically coded switching system, the electromechanical positioner moves the releasable pin, which allows the deadbolt to be moved (or which prohibits deadbolt movement, depending on the system configuration). In other switching systems, a switch or relay may be activated to energize another electrical circuit or device such as a light or other electrical appliance In order for this prior system to work, electrical power must be supplied to the electromechanical positioner. In some configurations electrical power must also be supplied to the electrical keypad. In any event, all such prior systems must be connected to an electrical power supply: either a battery or to house electricity. Battery power is undesirable because it is expensive, batteries need to be periodically replaced, and the voltage output from the batteries changes over use and over time.

The use of house electricity is undesirable because the system becomes inoperable when the building loses power. Also, the cost of hardwiring the system to the house electrical power is expensive. In this situation it is necessary to drill holes, run cable and mount junction boxes. Drilling holes and mounting junction boxes can be difficult and time consuming. Also, running electrical cable requires starting at an electromechanical positioner and/or keypad, and pulling cable through holes in the framing the service panel. Though simple in theory, getting cable to cooperate can be difficult and time consuming. Cable often kinks, tangles or binds while pulling, and needs to be straightened out somewhere along the run.

Thus, a problem with conventional electronically coded switching systems is that extensive wiring must be run both from the switch boxes to the lights and from the switch boxes to the power source in the service panels.

Another problem with conventional electronically coded switching systems is that the high voltage lines are present as an input to and an output from the keypad.

Another problem with conventional electronically coded switching systems is the cost associated with initial installation of wire to, from and between locking system components.

Another problem with prior wireless electronically coded switching systems is the cost and inconvenience associated with replacement of batteries.

Accordingly, it would be desirable to provide an electronically coded switching system that overcomes the aforementioned problems of the prior art.

SUMMARY OF THE INVENTION

The present invention provides a self-powered electronically coded switching system or device using an electroactive actuator. The piezoelectric element in the electroactive actuator is capable of deforming with a high amount of axial displacement, and when deformed by a mechanical impulse generates an electric field. The electroactive actuator is used as an electromechanical generator for generating an electrical signal that actuates a switch, relay and/or locking mechanism. In the preferred embodiment of the invention, the electromechanical generator comprises THUNDER.

In one embodiment of the present invention displaceable keyed buttons are each mechanically connected to individual piezoelectric generators. When depressed each piezoelectric element generates an electrical charge. In a second embodiment of the invention, all of individual depressible buttons are connected to a single (preferably larger) piezoelectric element. The larger piezoelectric element is capable of generating a larger electrical charge than a smaller element.

The electrical energy of the multiple button pushes is cumulatively stored, for example in a capacitor. The electrical energy generated by the depressed piezoelectric elements may be used in two ways. The first way is to send a small signal to a circuit that is capable of determining whether the buttons have been depressed in the "correct" sequence. For example, between the depressible buttons and the multiple small or single large piezoelectric elements may be a flexible "smart" keypad. The keypad, in concert with associated electrical circuitry powered by the piezoelectrically generated electricity, is capable of determining which buttons were pushed and in what sequence they are pushed. If the "correct" sequence has been depressed, the pin for the door lock is released. Additional components may be included in the smart keypad to allow for programming, reset and lockout functions.

A second additional way of using the electrical energy generated by the piezoelectric element(s) is to use the rest of the stored electrical charge to power a second piezoelectric bender element. The bender element piezoelectrically deforms due to the electrical charge applied to it by the circuit. The bender element is mechanically connected to the "releasable pin". When the bender element moves, it moves the releasable pin, which allows the "dead bolt" to be moved.

A third way of using the electrical energy generated by the piezoelectric element(s) is to use the electrical energy to power a transmitter and/or transmitter/receiver pair for actuation by transmission of a coded RF signal. When the correct coded signal is received, a switch or relay is activated, or a solenoid moves the releasable pin, which allows the "dead bolt" to be moved.

Accordingly, it is a primary object of the present invention to provide an electronic switching and/or unlocking device in which an electroactive or piezoelectric element is used to activate the device.

It is another object of the present invention to provide a device of the character described in which an electronic door lock may be installed without necessitating additional wiring.

It is another object of the present invention to provide a device of the character described in which electronic door locks may be installed without cutting holes into the building structure.

It is another object of the present invention to provide a device of the character described in which the electronic door lock does not require external electrical input such as 120 or 220 VAC or batteries.

It is another object of the present invention to provide a device of the character described incorporating an electroactive device that generates an electrical signal of sufficient magnitude and duration to activate an electronic keypad logic circuit.

It is another object of the present invention to provide a device of the character described incorporating an electroactive device that generates an electrical signal of sufficient duration and magnitude to activate a solenoid or locking pin for a door lock.

It is another object of the present invention to provide a device of the character described incorporating an electroactive device that generates an electrical signal of sufficient duration and magnitude to activate a second electroactive device coupled to a solenoid or locking pin for a door lock.

It is another object of the present invention to provide a device of the character described incorporating an electronic keypad that is capable of being set and reset with least one code.

It is another object of the present invention to provide a device of the character described incorporating an electroactive device that generates an electrical signal of sufficient duration and magnitude to activate a transmitter for sending at least one coded RF signal.

It is another object of the present invention to provide a device of the character described incorporating an electroactive device that generates at least one coded RF signal which may be received by a receiver and used to activate a switch or relay device.

It is another object of the present invention to provide a device of the character described incorporating an electronic keypad that is capable of locking out a user upon entry of an incorrect code.

It is another object of the present invention to provide a device of the character described for use in actuating access and security devices and other fixtures in a building.

It is another object of the present invention to provide a device of the character described for use in actuating multiple command functions for electrical devices and other fixtures in a building.

Further objects and advantages of the invention will become apparent from a consideration of the drawings and ensuing description thereof.

DESCRIPTION OF THE PREFERRED EMBODIMENT

Electroactive Generator

Figure 1:
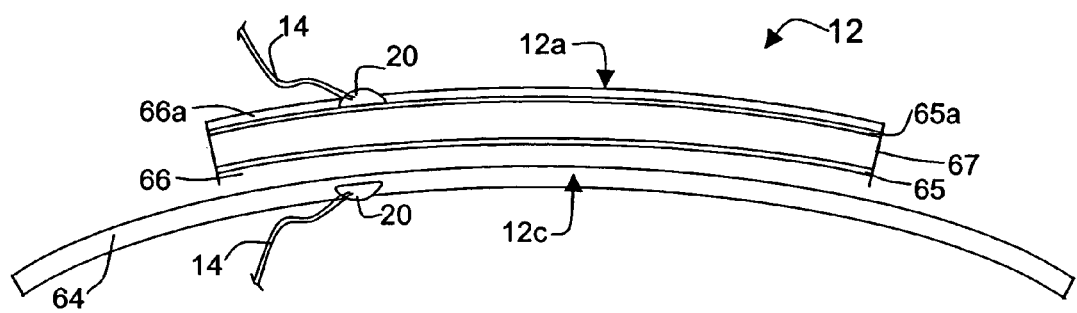
FIG. 1 is an elevation view showing the details of construction of a flextensional piezoelectric transducer used in the present invention, as an electroactive generator.

Piezoelectric and electrostrictive materials (generally called "electroactive" devices herein) develop an electric field when placed under stress or strain. The electric field developed by a piezoelectric or electrostrictive material is a function of the applied force and displacement causing the mechanical stress or strain. Conversely, electroactive devices undergo dimensional changes in an applied electric field. The dimensional change (i.e., expansion or contraction) of an electroactive element is a function of the applied electric field. Electroactive devices are commonly used as drivers, or "actuators" due to their propensity to deform under such electric fields. These electroactive devices when used as transducers or generators also have varying capacities to generate an electric field in response to a deformation caused by an applied force. In such cases they behave as electrical generators.

Electroactive devices include direct and indirect mode actuators, which typically make use of a change in the dimensions of the material to achieve a displacement, but in the present invention are preferably used as electromechanical generators. Direct mode actuators typically include a piezoelectric or electrostrictive ceramic plate (or stack of plates) sandwiched between a pair of electrodes formed on its major surfaces. The devices generally have a sufficiently large piezoelectric and/or electrostrictive coefficient to produce the desired strain in the ceramic plate. However, direct mode actuators suffer from the disadvantage of only being able to achieve a very small displacement (strain), which is, at best, only a few tenths of a percent. Conversely, direct mode generator-actuators require application of a high amount of force to piezoelectrically generate a pulsed momentary electrical signal of sufficient magnitude to activate a latching relay.

Indirect mode actuators are known to exhibit greater displacement and strain than is achievable with direct mode actuators by achieving strain amplification via external structures. An example of an indirect mode actuator is a flextensional transducer. Flextensional transducers are composite structures composed of a piezoelectric ceramic element and a metallic shell, stressed plastic, fiberglass, or similar structures. The actuator movement of conventional flextensional devices commonly occurs as a result of expansion in the piezoelectric material which mechanically couples to an amplified contraction of the device in the transverse direction. In operation, they can exhibit several orders of magnitude greater strain and displacement than can be produced by direct mode actuators.

The magnitude of achievable deflection (transverse bending) of indirect mode actuators can be increased by constructing them either as "unimorph" or "bimorph" flextensional actuators. A typical unimorph is a concave structure composed of a single piezoelectric element externally bonded to a flexible metal foil, and which results in axial buckling (deflection normal to the plane of the electroactive element) when electrically energized. Common unimorphs can exhibit transverse bending as high as 10%, i.e., a deflection normal to the plane of the element equal to 10% of the length of the actuator. A conventional bimorph device includes an intermediate flexible metal foil sandwiched between two piezoelectric elements. Electrodes are bonded to each of the major surfaces of the ceramic elements and the metal foil is bonded to the inner two electrodes. Bimorphs exhibit more displacement than comparable unimorphs because under the applied voltage, one ceramic element will contract while the other expands. Bimorphs can exhibit transverse bending of up to 20% of the Bimorph length.

For certain applications, asymmetrically stress biased electroactive devices have been proposed in order to increase the transverse bending of the electroactive generator, and therefore increase the electrical output in the electroactive material. In such devices, (which include, for example, "Rainbow" actuators (as disclosed in U.S. Pat. No. 5,471,721), and other flextensional actuators) the asymmetric stress biasing produces a curved structure, typically having two major surfaces, one of which is concave and the other which is convex.

Thus, various constructions of flextensional piezoelectric and ferroelectric generators may be used including: indirect mode actuators (such as "moonies" and, CYMBAL); bending actuators (such as unimorph, bimorph, multimorph or monomorph devices); prestressed actuators (such as "THUNDER" and rainbow" actuators as disclosed in U.S. Pat. No. 5,471,721); and multilayer actuators such as stacked actuators; and polymer piezofilms such as PVDF. Many other electromechanical devices exist and are contemplated to function similarly to power a transceiver circuit in the invention.

Referring to FIG. 1: The electroactive generator preferably comprises a prestressed unimorph device called "THUNDER", which has improved displacement and load capabilities, as disclosed in U.S. Pat. No. 5,632,841. THUNDER (which is an acronym for THin layer composite UNimorph ferroelectric Driver and sEnsoR), is a unimorph device in which a pre-stress layer is bonded to a thin piezoelectric ceramic wafer at high temperature. During the cooling down of the composite structure, asymmetrical stress biases the ceramic wafer due to the difference in thermal contraction rates of the pre-stress layer and the ceramic layer. A THUNDER element comprises a piezoelectric ceramic layer bonded with an adhesive (preferably an imide) to a metal (preferably stainless steel) substrate. The substrate, ceramic and adhesive are heated until the adhesive melts and they are subsequently cooled. During cooling as the adhesive solidifies the adhesive and substrate thermally contracts more than the ceramic, which compressively stresses the ceramic. Using a single substrate, or two substrates with differing thermal and mechanical characteristics, the actuator assumes its normally arcuate shape. The transducer or electroactive generator may also be normally flat rather than arcuate, by applying equal amounts of prestress to each side of the piezoelectric element, as dictated by the thermal and mechanical characteristics of the substrates bonded to each face of the piezo-element.

The THUNDER element 12 is as a composite structure, the construction of which is illustrated in FIG. 1. Each THUNDER element 12 is constructed with an electroactive member preferably comprising a piezoelectric ceramic layer 67 of PZT which is electroplated 65 and 65a on its two opposing faces. A pre-stress layer 64, preferably comprising spring steel, stainless steel, beryllium alloy, aluminum or other flexible substrate (such as metal, fiberglass, carbon fiber, KEVLAR™, composites or plastic), is adhered to the electroplated 65 surface on one side of the ceramic layer 67 by a first adhesive layer 66. In the simplest embodiment, the adhesive layer 66 acts as a prestress layer. The first adhesive layer 66 is preferably LaRC™-SI material, as developed by NASA-Langley Research Center and disclosed in U.S. Pat. No. 5,639,850. A second adhesive layer 66a, also preferably comprising LaRC-SI material, is adhered to the opposite side of the ceramic layer 67. During manufacture of the THUNDER element 12 the ceramic layer 67, the adhesive layer(s) 66 and 66a and the pre-stress layer 64 are simultaneously heated to a temperature above the melting point of the adhesive material. In practice the various layers composing the THUNDER element (namely the ceramic layer 67, the adhesive layers 66 and 66a and the pre-stress layer 64) are typically placed inside of an autoclave, heated platen press or a convection oven as a composite structure, and slowly heated under pressure by convection until all the layers of the structure reach a temperature which is above the melting point of the adhesive 66 material but below the Curie temperature of the ceramic layer 67. Because the composite structure is typically convectively heated at a slow rate, all of the layers tend to be at approximately the same temperature. In any event, because an adhesive layer 66 is typically located between two other layers (i.e. between the ceramic layer 67 and the pre-stress layer 64), the ceramic layer 67 and the pre-stress layer 64 are usually very close to the same temperature and are at least as hot as the adhesive layers 66 and 66a during the heating step of the process. The THUNDER element 12 is then allowed to cool.

Figure 2:
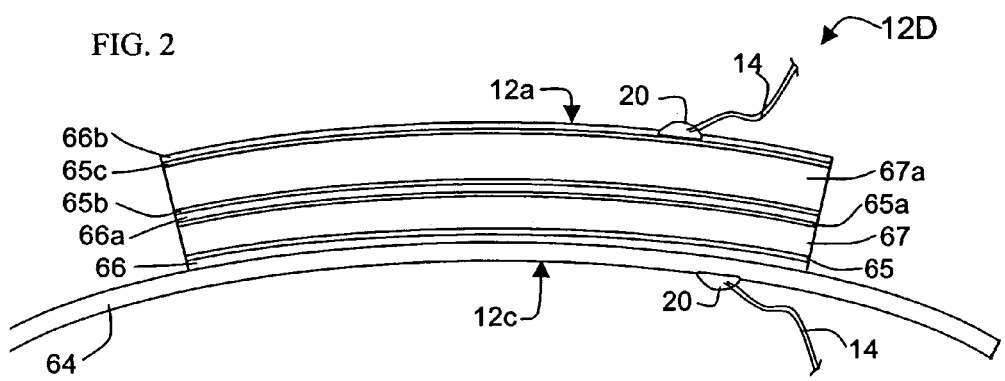
FIG. 2 is an elevation view showing the details of construction of an alternate multi-layer flextensional piezoelectric generator used in a modification of the present invention.

During the cooling step of the process (i.e. after the adhesive layers 66 and 66a have re-solidified) the ceramic layer 67 becomes compressively stressed by the adhesive layers 66 and 66a and pre-stress layer 64 due to the higher coefficient of thermal contraction of the materials of the adhesive layers 66 and 66a and the pre-stress layer 64 than for the material of the ceramic layer 67. Also, due to the greater thermal contraction of the laminate materials (e.g. the first pre-stress layer 64 and the first adhesive layer 66) on one side of the ceramic layer 67 relative to the thermal contraction of the laminate material(s) (e.g. the second adhesive layer 66a) on the other side of the ceramic layer 67, the ceramic layer deforms in an arcuate shape having a normally convex face 12a and a normally concave face 12c, as illustrated in FIGS. 1 and 2.

Figure 1A:
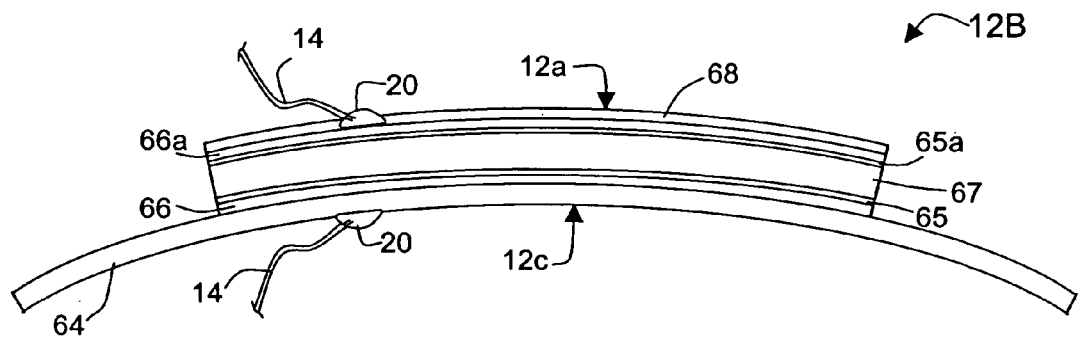
FIG. 1a is an elevation view showing the details of construction of the flextensional piezoelectric generator of FIG. 1 having an additional prestress layer.

Referring to FIG. 1a: One or more additional pre-stressing layer(s) may be similarly adhered to either or both sides of the ceramic layer 67 in order, for example, to increase the stress in the ceramic layer 67 or to strengthen the THUNDER element 12B. In a preferred embodiment of the invention, a second prestress layer 68 is placed on the concave face 12a of the THUNDER element 12B having the second adhesive layer 66a and is similarly heated and cooled. Preferably the second prestress layer 68 comprises a layer of conductive metal. More preferably the second prestress layer 68 comprises a thin foil (relatively thinner than the first prestress layer 64) comprising aluminum or other conductive metal. During the cooling step of the process (i.e. after the adhesive layers 66 and 66a have re-solidified) the ceramic layer 67 similarly becomes compressively stressed by the adhesive layers 66 and 66a and pre-stress layers 64 and 68 due to the higher coefficient of thermal contraction of the materials of the adhesive layers 66 and 66a and the pre-stress layers 64 and 68 than for the material of the ceramic layer 67. Also, due to the greater thermal contraction of the laminate materials (e.g. the first pre-stress layer 64 and the first adhesive layer 66) on one side of the ceramic layer 67 relative to the thermal contraction of the laminate material(s) (e.g. the second adhesive layer 66a and the second prestress layer 68) on the other side of the ceramic layer 67, the ceramic layer 67 deforms into an arcuate shape having a normally convex face 12a and a normally concave face 12c, as illustrated in FIG. 1a.

Alternately, the second prestress layer 68 may comprise the same material as is used in the first prestress layer 64, or a material with substantially the same mechanical strain characteristics. Using two prestress layers 64, 68 having similar mechanical strain characteristics ensures that, upon cooling, the thermal contraction of the laminate materials (e.g. the first pre-stress layer 64 and the first adhesive layer 66,) on one side of the ceramic layer 67 is substantially equal to the thermal contraction of the laminate materials (e.g. the second adhesive layer 66a and the second prestress layer 68) on the other side of the ceramic layer 67, and the ceramic layer 67 and the transducer 12 remain substantially flat, but still under a compressive stress.

Alternatively, the substrate comprising a separate prestress layer 64 may be eliminated and the adhesive layers 66 and 66a alone or in conjunction may apply the prestress to the ceramic layer 67. Alternatively, only the prestress layer(s) 64 and 68 and the adhesive layer(s) 66 and 66a may be heated and bonded to a ceramic layer 67, while the ceramic layer 67 is at a lower temperature, in order to induce greater compressive stress into the ceramic layer 67 when cooling the transducer 12.

Referring now to FIG. 2: Yet another alternate THUNDER generator element 12D includes a composite piezoelectric ceramic layer 69 that comprises multiple thin layers 69a and 69b of PZT which are bonded to each other or cofired together. In the mechanically bonded embodiment of FIG. 2, two layers 69a and 69b, or more (not shown) my be used in this composite structure 12D. Each layer 69a and 69b comprises a thin layer of piezoelectric material, with a thickness preferably on the order of about 1 mil. Each thin layer 69a and 69b is electroplated 65 and 65a, and 65b and 65c on each major face respectively. The individual layers 69a and 69b are then bonded to each other with an adhesive layer 66b, using an adhesive such as LaRC-SI. Alternatively, and most preferably, the thin layers 69a and 69b may be bonded to each other by cofiring the thin sheets of piezoelectric material together. As few as two layers 69a and 69b, but preferably at least four thin sheets of piezoelectric material may be bonded/cofired together. The composite piezoelectric ceramic layer 69 may then be bonded to prestress layer(s) 64 with the adhesive layer(s) 66 and 66a, and heated and cooled as described above to make a modified THUNDER transducer 12D. By having multiple thinner layers 69a and 69b of piezoelectric material in a modified transducer 12D, the composite ceramic layer generates a lower voltage and higher current as compared to the high voltage and low current generated by a THUNDER transducer 12 having only a single thicker ceramic layer 67. Additionally, a second prestress layer may be used comprise the same material as is used in the first prestress layer 64, or a material with substantially the same mechanical strain characteristics as described above, so that the composite piezoelectric ceramic layer 69 and the transducer 12D remain substantially flat, but still under a compressive stress.

Figure 3:
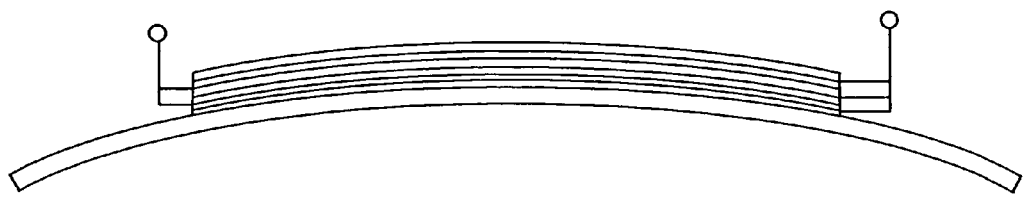
FIG. 3 is an elevation view showing the details of construction of an alternate multi-layer flextensional piezoelectric actuator used in a modification the present invention.

Referring now to FIG. 3: Yet another alternate THUNDER generator element 12E includes another composite piezoelectric ceramic layer 169 that comprises multiple thin layers 169a–f of PZT which are cofired together. In the cofired embodiment of FIG. 3, two or more layers 169a–f, and preferably at least four layers, are used in this composite structure 12E. Each layer 169a–f comprises a thin layer of piezoelectric material, with a thickness preferably on the order of about 1 mil, which are manufactured using thin tape casting for example. Each thin layer 169a–f placed adjacent each other with electrode material between each successive layer. The electrode material may include metallizations, screen printed, electro-deposited, sputtered, and/or vapor deposited conductive materials. The individual layers 169a–f and internal electrodes are then bonded to each other by cofiring the composite multi-layer ceramic element 169. The individual layers 169a–f are then poled in alternating directions in the thickness direction. This is accomplished by connecting high voltage electrical connections to the electrodes, wherein positive connections are connected to alternate electrodes, and ground connections are connected to the remaining internal electrodes. This provides an alternating up-down polarization of the layers 169a–f in the thickness direction. This allows all the individual ceramic layers 169a–f to be connected in parallel. The composite piezoelectric ceramic layer 169 may then be bonded to prestress layer(s) 64 with the adhesive layer(s) 66 and 66a, and heated and cooled as described above to make a modified THUNDER transducer 12D.

Figure 2A:
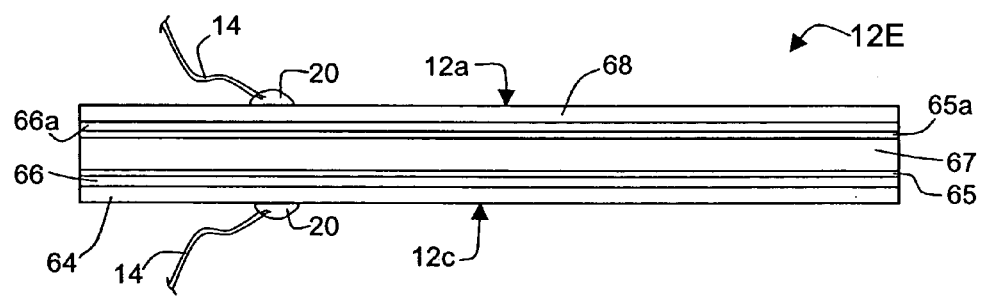
FIG. 2a is an elevation view showing the details of construction of the flextensional piezoelectric generator of FIG. 1a with a flat rather than arcuate profile.

Referring again to FIGS. 2, 2a and 3: By having multiple thinner layers 69a and 69b (or 169a–f) of piezoelectric material in a modified transducer 12D–F, the composite ceramic layer generates a lower voltage and higher current as compared to the high voltage and low current generated by a THUNDER transducer 12 having only a single thicker ceramic layer 67. This is because with multiple thin paralleled layers the output capacitance is increased, which decreases the output impedance, which provides better impedance matching with the electronic circuitry connected to the THUNDER element. Also, since the individual layers of the composite element are thinner, the output voltage can be reduced to reach a voltage which is closer to the operating voltage of the electronic circuitry (in a range of 3.3V–10.0V) which provides less waste in the regulation of the voltage and better matching to the desired operating voltages of the circuit. Thus the multilayer element (bonded or cofired) improves impedance matching with the connected electronic circuitry and improves the efficiency of the mechanical to electrical conversion of the element.

A flexible insulator may be used to coat the convex face 12a of the transducer 12. This insulative coating helps prevent unintentional discharge of the piezoelectric element through inadvertent contact with another conductor, liquid or human contact. The coating also makes the ceramic element more durable and resistant to cracking or damage from impact. Since LaRC-SI is a dielectric, the adhesive layer 67a on the convex face 12a of the transducer 12 may act as the insulative layer. Alternately, the insulative layer may comprise a plastic, TEFLON or other durable coating.

Electrical energy may be recovered from or introduced to the generator element 12 (or 12D) by a pair of electrical wires 14. Each electrical wire 14 is attached at one end to opposite sides of the generator element 12. The wires 14 may be connected directly to the electroplated 65 and 65a faces of the ceramic layer 67, or they may alternatively be connected to the pre-stress layer(s) 64 and or 68. The wires 14 are connected using, for example, conductive adhesive, or solder 20, but most preferably a conductive tape, such as a copper foil tape adhesively placed on the faces of he electroactive generator element, thus avoiding the soldering or gluing of the conductor. As discussed above, the pre-stress layer 64 is preferably adhered to the ceramic layer 67 by LaRC-SI material, which is a dielectric. When the wires 14 are connected to the pre-stress layer(s) 64 and/or 68, it is desirable to roughen a face of the pre-stress layer 68, so that the pre-stress layer 68 intermittently penetrates the respective adhesive layers 66 and 66a, and makes electrical contact with the respective electroplated 65 and 65a faces of the ceramic layer 67. Alternatively, the Larc-SI adhesive layer 66 may have a conductive material, such as Nickel or aluminum particles, used as a filler in the adhesive and to maintain electrical contact between the prestress layer and the electroplated faces of the ceramic layer(s). The opposite end of each electrical wire 14 is preferably connected to an electric pulse modification circuit 10.

Prestressed flextensional transducers 12 are desirable due to their durability and their relatively large displacement, and concomitant relatively high voltage that such transducers are capable of developing when deflected by an external force. The present invention however may be practiced with any electroactive element having the properties and characteristics herein described, i.e., the ability to generate a voltage in response to a deformation of the device. For example, the invention may be practiced using magnetostrictive or ferroelectric devices. The transducers also need not be normally arcuate, but may also include transducers that are normally flat, and may further include stacked piezoelectric elements.

Although in the preferred embodiment of the invention, the electromechanical generator comprises a THUNDER actuator 12 or other electroactive element, it is within the scope of the invention to include other types of electromechanical generators. For example. The electromechanical generator may comprise a series of coils and one or more magnets. When the buttons of the keypad are pressed the coils and magnets have motion relative to each other, and this induces a current in the coils.

Mechanical Deflector

In operation, when a force is applied to a face 12a or 12c, preferably the convex face 12a of the actuator 12, the force deforms the piezoelectric element 67. The force may be applied to the piezoelectric actuator 12 by any appropriate means such as by application of manual pressure directly to the piezoelectric actuator 12, or by other mechanical means. The mechanical impulse (or removal thereof) is of sufficient force to cause the actuator 12 to deform quickly and accelerate over a distance (approximately 1–5 mm) which generates an electrical signal of sufficient magnitude to activate an electronic keypad circuit. Preferably the electrical signal developed is also of sufficient magnitude to actuate a solenoid coupled to a release pin for a door lock. In the embodiments of the invention in FIGS. 4–8, pressure is applied directly to the actuator 12 by pushing on (mechanically activating) the membrane switches, electronic keypad and/or faceplate.

The force may also be applied to an edge of the actuator 12. More specifically, the actuator 12 has first and second ends 121, 122. One of the ends 121 is preferably in a fixed, i.e., non-moveable position via appropriate fixation means such as clamps 75 and/or screws 76. The opposite end, or free end 122 may be deflected by appropriate deflection means.

A description of the various means of applying a releasing a force to deflect the edge 122 of the actuator 12 (both flat and arcuate), thereby producing the desired electrical signal is included in: commonly owned U.S. Pat. No. 6,630,894 to Boyd et al, entitled "Self-Powered Switching Device"; copending U.S. patent application Ser. No. 09/990,617 To Face entitled "Self-Powered Trainable Switching Network"; copending U.S. patent application Ser. No. 10/188,633 To Face entitled "Self-Powered Switch Initiation System"; and copending U.S. Patent application Ser. No. 10/871,082 To Face et al entitled "Self-Powered Switch Initiation System", all of which are hereby incorporated by reference.

Figure 11A:
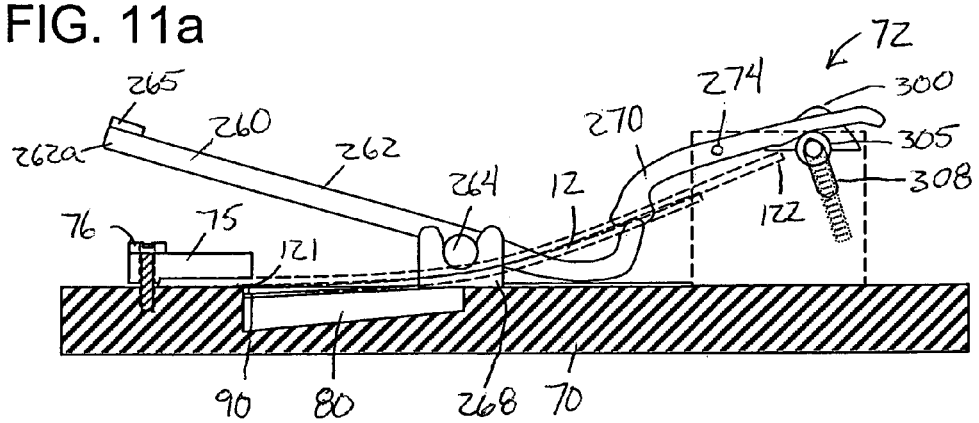
FIGS. 11a and 11b are elevation views of the preferred deflector assembly of the present invention showing the transducer in the undeflected and deflected positions respectively.
Figure 11B:
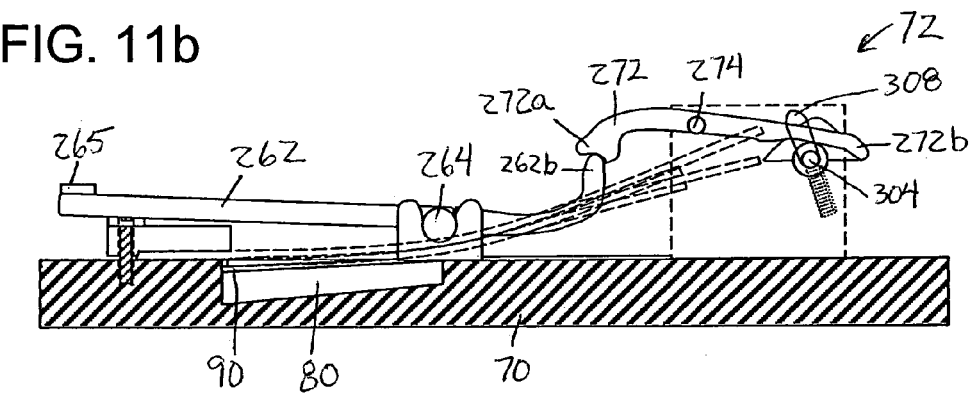
Figure 11C:
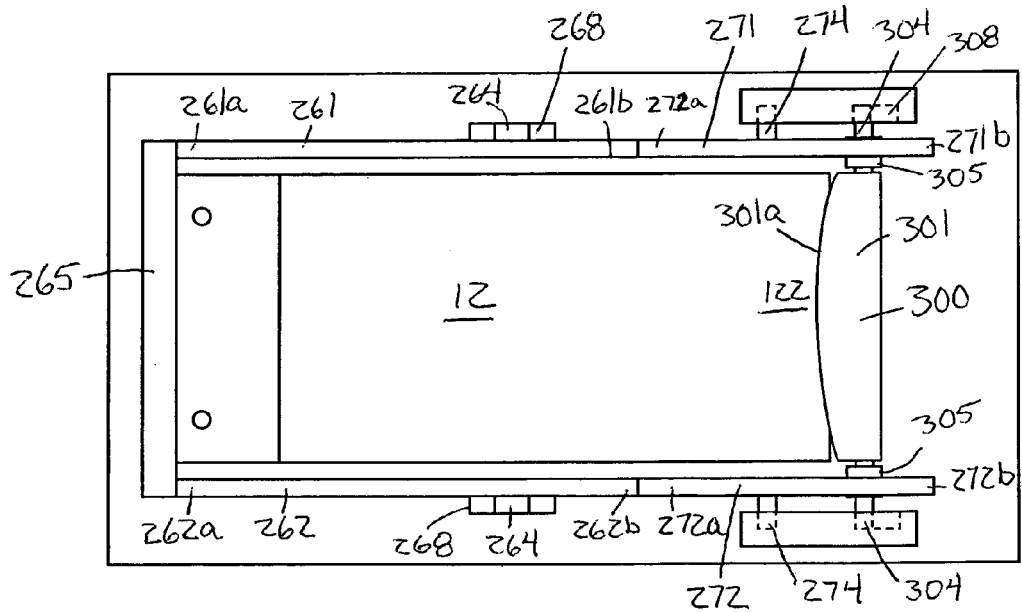
FIG. 11c is a plan view of the preferred deflector assembly of the present invention showing the transducer in the undeflected position.

Referring now to FIGS. 11*a*–*c:* FIGS. 11*a*–*c* show the preferred embodiment of a base plate 70 with a deflector assembly 72 and containing the transducer 12. The transducer 12 is mounted with one end 121 of the transducer 12 placed between the surfaces the clamping and base plates 75 and 70 such that the substrate 64 contacts both surfaces 75*a* and 70*a*. Alternately, the end 121 of the transducer 12 may be mounted between clamping plates 185, 187. The ceramic layer 67 which extends above the surface of the substrate 64 on the convex face 12*a* extends into the recessed area 80 of the base plate 70. This prevents the ceramic layer 67 from contacting the upper surface 70*a* of the base plate 70, and cushions the ceramic layer 67 against the compliant layer 85 in the recess 80, thereby reducing potential for damage to the ceramic layer 67. A deflector assembly 72 is mounted on the base plate 70 above and to the sides of the transducer 12. This deflector assemble 72 has a lower profile than previously described deflector assemblies 72 by virtue of the use of two cooperating counter-rotating lever assembles 260, 270 and a plucker assembly 300.

Referring again to FIGS. 11*a*–*c:* The deflector assembly comprises a swing arm 260, which is essentially a first lever mounted above the clamped end 121 of the transducer 12 and tending towards the free end 122. The swing arm 260 preferably has two pivot arms 261 and 262 connected by a cross bar 265. The pivot arms 261 and 262 tend from above the clamped end 121 of the transducer 12 and tending towards the free end 122 of the transducer 12, along each side of the transducer 12 to prevent contact therebetween. A first end 261*a*, 262*a* of each pivot arm 261, 262 is connected to the two ends of a cross bar 265, which is situated above the clamping plate 75. Each pivot arm 261, 262, has a pin 264 extending outwardly from the transducer 12, located centrally on the pivot arms 261, 262. The pins are pivotably mounted within fulcrum clips 268, which allows the swing arm assembly 260 to pivot about the pins 264 and the fulcrum clips 268. The ends 261*b*, 262*b* of the pivot arms 261, 262 opposite the crossbar 265 are preferably upwardly curved to tend substantially vertically, or more preferably slightly off vertical and towards the free end 122 of the transducer 12 and rocker arm 270 assemblies. The curved ends 261,*b*, 262*b* of the pivot arms 261, 262 may alternately be C-shaped, i.e., first curve downwardly (towards the base plate 70, and then upwardly. To accommodate the downward curve of the pivot arm ends 261*b*, 262*b*, the base plate 70 may contain recesses (not shown) within which the curved ends 261*b*, 262*b* may housed.

Referring again to FIGS. 11*a*–*c:* The deflector assembly also comprises a rocker assembly 270, which is essentially a pair of second levers 271, 272 mounted above the free end 122 of the transducer 12 and tending towards and beyond the free end 122. The rocker assembly 270 preferably has two rocker arms 271 and 272 pivotably mounted to contact both the pivot arms 261, 262 and the plucker assembly 300. The rocker arms 271 and 272 tend from above the curved ends 261*b*, 262*b* of the pivot arms 261, 262 and tend towards and slightly beyond the free end 122 of the transducer 12, and along each side of the transducer 12 to prevent contact therebetween. Each of the rocker arms 271, 271 has a pin 274 thereon, extending outwardly from the transducer 12. Each of these pins 274 is pivotably mounted within a pivot hole 278 of the plucker housing 290. This allows each rocker arm 271, 272, to rotate about its respective pin 274 in response to a force on either end 271*a*, 272*a*, 271*b*, 272*b* of the rocker arm 271, 272. Each first end 271*a*, 272*a* of the rocker arms 271, 272 is in contact with the second ends 261*b*, 262*b* of the pivot arms 261, 262. When the crossbar 265 is depressed, the second ends 261*b*, 262*b* of the pivot arms 261, 262 move upwardly and contact the first ends 271*a*, 272*a* of the rocker arms 271, 272, causing the rocker arms 271, 272 to rotate about the rocker arm pins 274.This causes the second ends 271*b*, 272*b* of the rocker arms 271, 272 to be depressed.

Referring again to FIGS. 11*a*–*c:* The deflector assembly also comprises a plucker assembly 300, which is essentially a slidably mounted curved paddle situated above the free end 122 of the transducer 12. The plucker assembly 300 is in contact with the rocker assembly 270 and is adapted to side downwardly within a pair of grooves in response to a downward motion from the second ends 271*b*, 272*b* of the rocker arms 271, 272. More specifically, the plucker assembly 300 comprises a plucker paddle 301, situated above and in contact with the free end 122 of the transducer 12. Connected to each end 301*a*, 301*b* of the plucker paddle 301 is a roller 305, which is in contact with the rocker arms 271, 272. Tending outwardly from each roller 305 is a slide pin 304. The slide pins 304 are slidably mounted within slide grooves 308 in the plucker housings 290. The slide grooves 308 tend from a maximum vertical position and downwardly away from the free end 122 of the transducer 12 to a minimum position beyond the free end 122 of the transducer 12. Thus, when the plucker assembly 300 is moved downwardly, the slide pins 304 and slide grooves 308 cause the plucker paddle 301 to move simultaneously downward and away from the free end of 122 the transducer 12.

Thus, when the crossbar 265 is depressed, the second ends 261*b*, 262*b* of the pivot arms 261, 262 move upwardly and contact the first ends 271*a*, 272*a* of the rocker arms 271, 272, causing the rocker arms 271, 272 to rotate about the rocker arm pins 274. This causes the second ends 271*b*, 272*b* of the rocker arms 271, 272 to be depressed. As the second ends 271*b*, 272*b* of the rocker arms 271, 272 are depressed, they contact the rollers 305 with a downward force, and the plucker assembly 300 is guided by the slide pins 304 and slide grooves 308 to cause the plucker paddle 301 to move simultaneously downward and away from the free end of 122 the transducer 12. The minimum or lowest position of the plucker assembly is beyond the free end 122 of the transducer 12, and therefore, as the plucker paddle 301 moves downward and outward, the free end 122 of the transducer 12 is released by the plucker paddle 301. Thus as the plucker assembly is depressed, the free end 122 of the transducer 12 is depressed from its neutral position 291 to a deflected position 292 at which position the paddle 301 releases the free end 122 of the transducer 12. The free end 122 of the transducer 12 then oscillates between positions 291 and 292.

Referring now to FIG. 11*c:* The plucker paddle 301 preferably has an edge 301*a* that contacts the free end 122 of the transducer 12 that has a radius in both in the thickness dimension (i.e., vertically corresponding to the thickness of the transducer 12 edge) and the transverse dimension (i.e., horizontally corresponding to the length of the transducer 12 edge) in order to advantageously release the free end 122 very quickly, i.e., without dragging across the end 122 of the transducer 12, which slows its release. It has been found that the more quickly and cleanly you release the end 122 of the transducer 12 during a "pluck", the greater the output. This increases output without increasing the required plucking force. To be precise, the energy developed by the piezoelectric element 67 has been found to be a function of the acceleration of the piezoelectric element 67, rather than the speed of the "pluck." It is possible "pluck" very slowly, and get excellent performance, so long as the piezoelectric element 67 is released fully and completely and as nearly instantly as possible. To determine the desired shape of the tip 301a of the plucker paddle 301, several plucker paddles were designed and released very, very slowly, in attempting to get a quick "release" of the end 122 of the transducer 12. If the plucker paddle 301 did not have a radius on the tip, but instead had a rectangular shape, it was found that the end 301a of the plucker paddle 301 (the thickness dimension) actually "dragged" across the edge 122 of the transducer 12, slowing the release, and decreasing the electrical output. Thus, increasing the rate of "release" of the element's edge 122 improved the acceleration and the output. Thus, the radius of the tip 301a (in the thickness dimension) of the "plucker" paddle 301 contributes substantially to how quickly the transducer 12 edge 122 gets off the paddle. This has been shown to have a direct effect on electrical performance, because a smaller radius equates to a quicker "release" which equates to greater electrical output. If the paddle 301 is manufactured from sufficiently hard materials, or is hardened, the edge 301a of the paddle 301 can be made with an even smaller radius. The tip 301a of the plucking paddle 301 may be coated with a very hard material with low friction, thereby lowering the plucking resistance. This approach can prove to be useful in increasing the power output of a transducer 12 without increasing the required displacement or amount of bending, and may allow the generation of the same amount of energy with lower "button force" by the user of the device, as well as being useful in increasing wear resistance for applications requiring many hundreds of thousands of switch cycles.

Electronic Digital Switching System

Referring to FIGS. 4 through 8: An electronic digital entry system comprises one ore more electroactive devices 12 and a keypad 320 for entry of a digital code or sequence, as well as an interface circuit 340 for using the electrical energy of the electroactive device(s) 12 and interpretation of the sequence entered into the keypad 320. The interface circuit 340 comprises an energy storage subcircuit 31, U2 and C15 and a logic subcircuit 340.

Referring again to FIG. 4: The keypad comprises an overlay pad 320 having a number of alphanumeric keys 321, 322, 323 thereon mounted on a keypad housing 330. Preferably, the keypad 320 has at least 10 numeric keys corresponding to the numbers 0–9. The keypad 320 may also have alphabetic characters thereon corresponding for example to the letters A–Z or whatever alphabet is used in the particular country. The keypad 320 may also have function keys for commands such as "ENTER", "LOCK", "RESET", "CANCEL", "BACKSPACE", "ARM" or the like. Most preferably, the keypad 320 has the numbers 0–9 and the commands "ENTER" and "CANCEL" thereon. Additional commands available may include "ON", "OFF", "DIM", "UNDIM", "ACTIVATE", or a selection of toggles switches for selected devices including lights, electrical appliances, door locks, alarm systems, entry systems, fans, electronic devices and the like.

The individual buttons 321, 322, 323 on the keypad 320 are easily depressible buttons that may take a variety of forms. As an example of types of keypad buttons that may be used are flat membrane switches 321, 322, 323 and domed membrane switches 321, 322, 323 and may further include LEDs or the like as indicators of the switch or button state. For example, flat membrane switches 321, 322, 323 comprise a button overlay material of polyester or polycarbonate with circuit connectors installed thereunder and are depressible with an applied force of 70–120 grams. Domed membrane switches 321, 322, 323 have a better sense of touch and may be actuated with an operating force of 150–400 grams. The overlay material comprises a flexible yet durable material such as plastic, polyester or polycarbonate with electrical connectors installed thereunder.

Basically, a membrane switch 321, 322, 323 as its name implies an electrical switch created on a thin film or membrane. They are typically low power with maximum current ratings of around $1/10$ of an amp. The circuitry for these devices is often somewhat elaborate since they frequently provide connections for a host of different input functions. Perhaps the most common application for membrane switches 321, 322, 323 is in a keyboard of some type. While not all keyboards are made of flexible materials, a great many are. The most common layouts are matrix type (i.e., rows and columns) and common line connections (i.e., a common trace plus some number of switches). Other structures are possible depending on the needs of the user including integration of electronic circuits, including passives devices, such as resistors, and land patterns for component mounting.

The conductor material used for membrane switches 321, 322, 323 varies by application. Copper and polymer thick film (PTF) inks are the most common choices. Cost is normally a key factor when making the choice. Because of this, a substantial number of membrane switches have screen-printed PTF conductors consisting of metal-filled ink. Obviously, the normally much lower conductivity of printed inks limits the conductivity but they are not normally meant to carry current. Rather they are designed to send a simple signal pulse. Copper is employed when there is need to solder devices to the membrane or higher conductivity is needed, however, conductive adhesives have proven quite acceptable in most applications.

The switch-life of a membrane contact can vary significantly from several thousand to many millions. The life-determining factors are many, and include such matters as materials of construction, contact design, switch travel, and operating conditions among many others.

One of the key elements of membrane switch design is involved in determining tactile feedback. This is that little snap or click that can be felt when a switch is pressed. Determining the right amount of force to be applied (the actuation pressure) is both an art and a science. There are basically two approaches to getting tactile feed back: metal dome contacts and polymer dome contacts. Metal dome tactile switches have spring metal dome over the contact area. When pressed, it snaps down to complete a circuit and snaps back when released. The shape and thickness of the metal (commonly spring stainless steel) will determine actuation force. They offer a long life but are not well suited to use with flex circuits. In contrast, polymer dome switches are embossed into the plastic film overlying the circuit. It is possible to get a good tactile feel from such contact, and though their life expectation is heavily influenced by their use environment, they can still endure millions of cycles. Furthermore, they have the advantage when it comes to cost since they reduce the number of parts, thus assembly time and complexity. Depending on the application, one can opt to not use tactile feedback. To this end, an auditory response method may be employed such as a small beep. Because of their extreme simplicity, these tend to be the lowest cost contacts of all.

Figure 17:
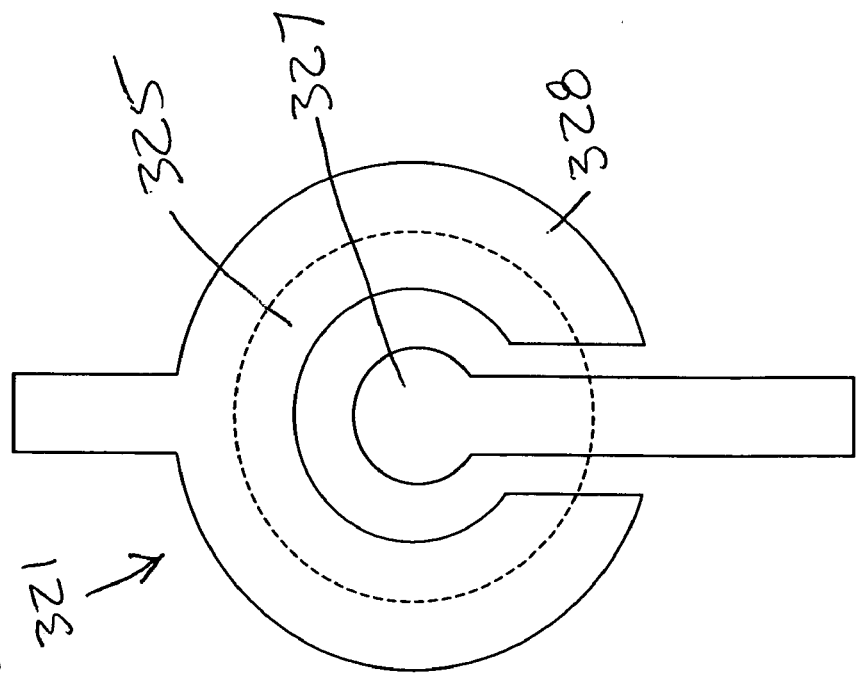
FIG. 17 is a plan view of a domed contact switch showing disconnected concentric circuit traces, with the domed contact in ghost thereabove.
Figure 18:
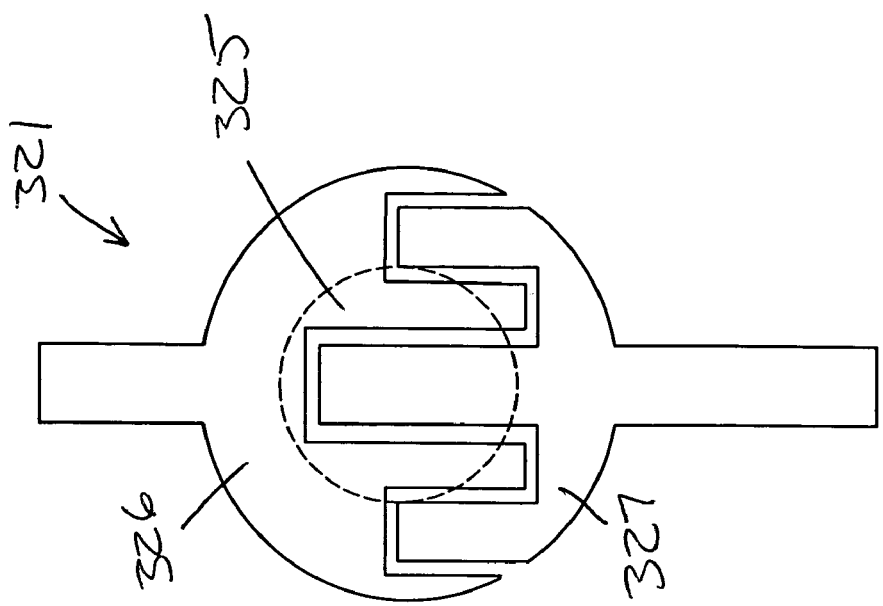
FIG. 18 is a plane view of a contact switch showing disconnected interdigitated circuit traces, with the shorting contact in ghost thereabove.

Basic membrane switch contact designs are shown without an over layer in FIGS. 17 and 18. The shorting contact 325 of FIG. 18 on the right is normally attached to a resilient material that holds it off the surface of the interdigitated fingers 326 and 327 when it is not pressed down. The shorting contact 325 of FIG. 17 is a metallic dome situated above concentric electrical traces 328 and 329, and when the dome 325 is pressed contacts at least the outer circular trace 328, and when fully depressed contacts bother the inner 329 and outer 328 traces.

The contact area design is another important and interesting element of a membrane switch. Contact finish can vary. Gold, nickel, silver and even graphite have been used. The layout will vary with the type of contact used. For example, for a shorting contact, interdigitated fingers are often used. However, when a metal dome contact is employed, a central contact with a surrounding ring is frequently seen.

Figure 5:
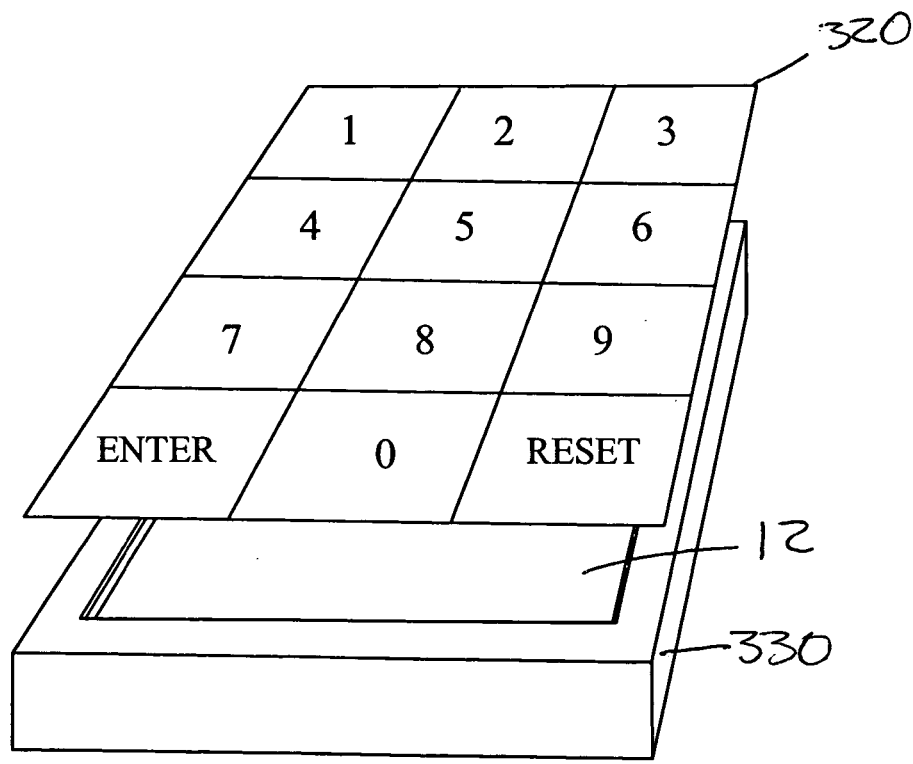
FIG. 5 is a perspective view of one embodiment of the invention incorporating a single larger piezoelectric element, beneath all the keypad buttons.
Figure 6:
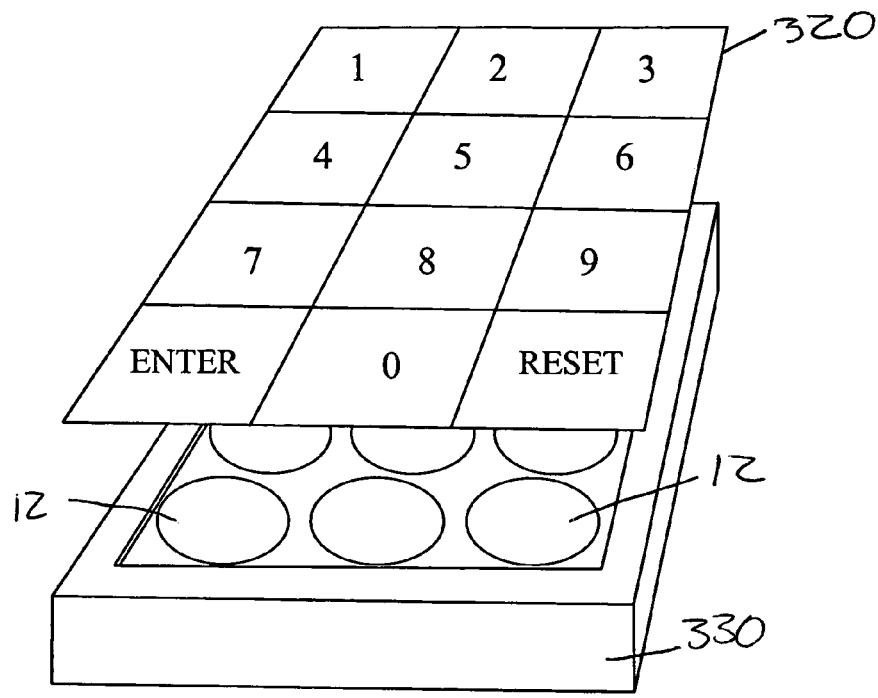
FIG. 6 is a perspective view of one embodiment of the invention incorporating multiple piezoelectric elements, wherein each keypad button has a piezoelectric element thereunder.
Figure 7:
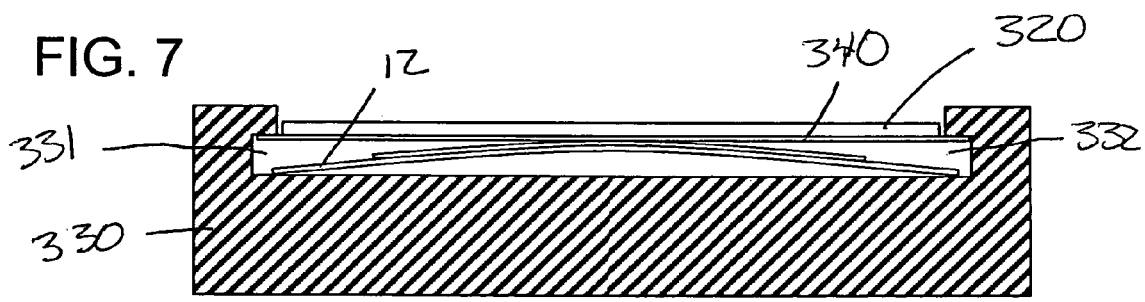
FIG. 7 is a cross-sectional elevation view of the device of FIG. 5 showing the actuator and recesses.
Figure 8:
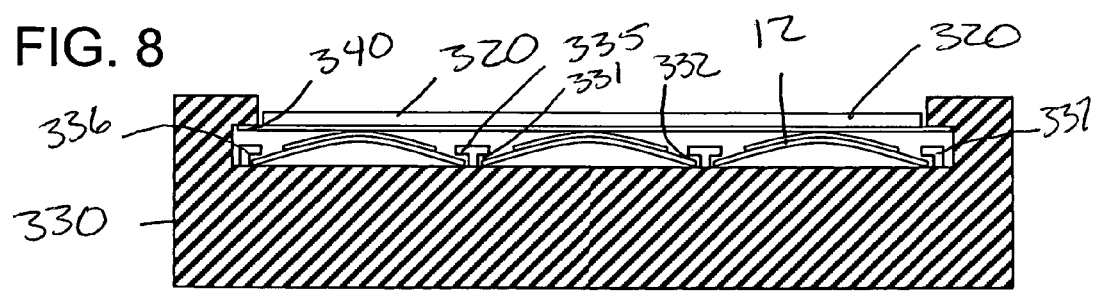
FIG. 8 is a cross-sectional elevation view of the device of FIG. 6 showing the actuators and recesses.

Referring now to FIGS. 5 and 7: In one embodiment of the invention a polyester or polycarbonate overlay material having twelve switch buttons 321, 322, 32323 thereon is used with an individual THUNDER element 12 lying beneath each button. As shown in FIGS. 6 and 8, alternately an overlay with flat membrane switch buttons 321, 322, 32323 may be used above individual THUNDER elements 12. In the preferred embodiment of the invention, the overlay material has twelve domed switch buttons 321, 322, 323 overlying a single large THUNDER element 12. However, either flat or domed membrane switches may be used with either a single or multiple piezoelectric elements thereunder.

Referring to FIG. 7: The overlay of buttons and the underlying THUNDER element(s) are preferably retained in the face plate section 330 of the keypad assembly. The face plate section 330 of the keypad assembly has one or more recesses 331, 332 therein which retain the overlay material and underlying THUNDER element(s). The face plate section 330 is preferably the same shape as the overlay 320, and more preferably a square plate having a flat surface and a lip around the periphery of the flat surface which forms the recess 331, 332. The recess 331, 332 is suitable for retaining the overlay 320 about its edge between the flat surface of the face plate and the lip. In the embodiment of FIG. 5, the recess 331, 332 is also suitable for retaining two edges of the THUNDER element, and deep enough to allow the edges of the THUNDER element to deeper into the recess when it deforms.

Referring now to FIG. 8: The face plate may also comprise additional recesses for retaining the individual smaller THUNDER elements. The recesses are 331, 332, 335–7 in the flat surface of the face plate and are the substantially the same shape as the THUNDER element retained therein. The shape of the THUNDER button recesses allows them to be retained within the recess yet allows some room for the THUNDER element to extend further thereinto when the THUNDER element is deformed by the pressing of a membrane switch. Preferably, the recess 331, 332, 335–7 retains the edges of the THUNDER element 12 in its neutral arcuate shape and also deep enough to accommodate the THUNDER element in its deformed flattened state. In the embodiment of FIGS. 6 and 8, the face plate has twelve circular recesses in its flat outer surface which retain twelve circular THUNDER elements. The diameter of each recess below the outer surface of the face plate is slightly larger than the diameter of the THUNDER element retained therein and the diameter of each recess at the outer surface of the face plate is slight smaller than the diameter of the THUNDER element retained therein. FIG. 6 shows circular piezo-elements retained in circular recesses, but the elements may also be square, rectangular or a variety of other shapes with recesses accommodating that shape, in order to maximized the amount of power harvested from the deformation of the element.

Figure 4:
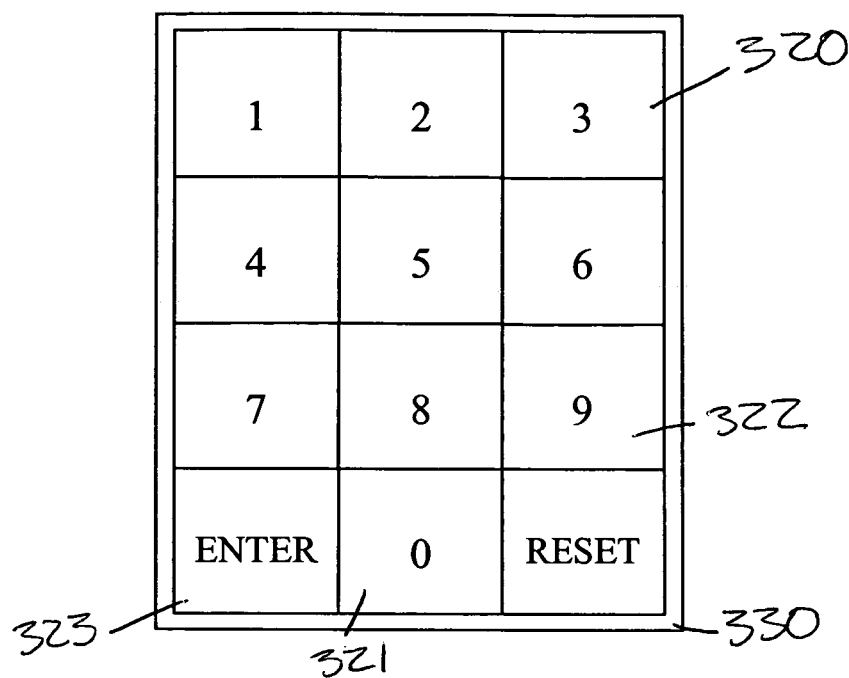
FIG. 4 is a plan view of an exemplary data input panel (keypad) for entering data via membrane switches.

In operation, when one button 321, 322, 323 is pressed, the THUNDER element 12 underlying the button or buttons is deformed. More specifically, when a button 321 of the keypad 320 of FIG. 4 is pressed, the THUNDER element 12 beneath that button 321 will deform. For the keypad of FIGS. 5 and 7, when any button on the keypad 320 is pressed, the whole THUNDER element 12 will deform. For the keypad of FIGS. 6 and 8, when a button 321 on the keypad 320 is pressed, the underlying THUNDER element 12 will deform.

As previously mentioned, the applied force causes the piezoelectric actuator 12 to deform. By virtue of the piezoelectric effect, the deformation of the piezoelectric element 67 generates an instantaneous voltage between the faces 12a and 12c of the actuator 12, which produces a pulse of electrical energy. Furthermore, when the force is removed from the piezoelectric actuator 12, the actuator 12 recovers its original arcuate shape. This is because the substrate or prestress layers 64 and 68 to which the ceramic 67 is bonded exert a compressive force on the ceramic 67, and the actuator 12 thus has a coefficient of elasticity that causes the actuator 12 to return to its undeformed neutral state. On the recovery stroke of the actuator 12, the ceramic 67 returns to its undeformed state and thereby produces another electrical pulse of opposite polarity. The downward (applied) or upward (recovery) strokes should cause a force over a distance that is of sufficient magnitude to create the desired electrical pulse. The duration of the recovery stroke, and therefore the duration of the pulse produced, is preferably in the range of 5–100 milliseconds, depending on the amount of force applied to the actuator 12.

The electrical signal generated by the actuator 12 is applied to downstream circuit elements via wires 14 connected to the actuator 12. More specifically, a first wire 14 is connected to the electrode 90 which extends into the recess 80 and contacts the electrode 68 on the convex face 12a of the actuator 12. Preferably the wire 14 is connected to the electrode 90 outside of the recess close to the end of the base plate 70 opposite the end having the clamping member 75. A second wire 14 is connected directly to the first prestress layer 64, i.e., the substrate 64 which acts as an electrode on the concave face 12c of the actuator 12.

Referring to FIGS. 9–10, and 14–15: The actuator 12 is connected to circuit components in order to generate a signal for actuation of the interface circuit. The actuator 12 is first connected to a rectifier 31. Preferably the rectifier 31 comprises a bridge rectifier 31 comprising four diodes D1, D2, D3 and D4 arranged to only allow positive voltages to pass. The first two diodes D1 and D2 are connected in series, i.e., the anode of D1 connected to the cathode of D2. The second two diodes D3 and D4 are connected in series, i.e., the anode of D3 connected to the cathode of D4. The anodes of diodes D2 and D4 are connected, and the cathodes of diodes D1 and D3 are connected, thereby forming a bridge rectifier. The rectifier is positively biased toward the D2–D4 junction and negatively biased toward the D1–D3 junction. One of the wires 14 of the actuator 12 is electrically connected between the junction of diodes D1 and D2, whereas the other wire 14 (connected to the opposite face of the actuator 12) is connected to the junction of diodes D3 and D4. The junction of diodes D1 and D3 are connected to ground. A capacitor C11 is preferably connected on one side to the D2–D4 junction and on the other side of the capacitor C11 to the D1–D3 junction in order to smooth the rippled voltage and isolate the voltages at each side of the rectifier from each other. Therefore, any negative voltages applied to the D1–D2 junction or the D3–D4 junction will pass through diodes D1 or D3 respectively to ground. Positive voltages applied to the D1–D2 junction or the D3–4 junction will pass through diodes D2 or D4 respectively to the D2–4 junction.

The circuit also comprises a voltage regulator U2, which controls magnitude of the input electrical signal downstream of the rectifier 31. The rectifier 31 is electrically connected to a voltage regulator U2 with the D2–4 junction connected to the Vin pin of the voltage regulator U2 and with the D1–D3 junction connected to ground and the ground pin of the voltage regulator U2. The voltage regulator U2 comprises for example a LT1121 chip voltage regulator U2 with a 3.3 volts DC output. The output voltage waveform is shown in FIG. 10c and comprises a substantially uniform voltage signal of 3.3 volts having a duration of approximately 100–250 milliseconds, depending on the load applied to the actuator 12. The regulated waveform is shown in FIG. 10b. The output voltage signal from the voltage regulator (at the Vout pin) may then be transmitted via another conductor to the relay switch 290, in order to change the position of a relay switch 290 from one position to another. Preferably however, the output voltage is connected through an encoder 40 to an RF generation section 50 of the circuit.

Referring now to FIGS. 9–10, 15 and 16: The regulated voltage is almost instantaneous and is sufficient to provide power to the keypad 320 and 340 in order to register the contact of each button 321, 322, 323 or command pressed on the keypad 320. Additionally, residual electrical energy (not used by the keypad) is stored in capacitor C15, or in other embodiments a rechargeable battery). As each successive button on the keypad is punched, the capacitor C15 stores more energy, and the logic circuit 340 downstream of the keypad 320 registers which buttons have been actuated. The logic component 340 is typically a simple PIC (Programmable interface controller) which stores one or more acceptable codes (such as access codes and codes which perform different functions or identify specific individuals assigned that code.)

Figure 9:
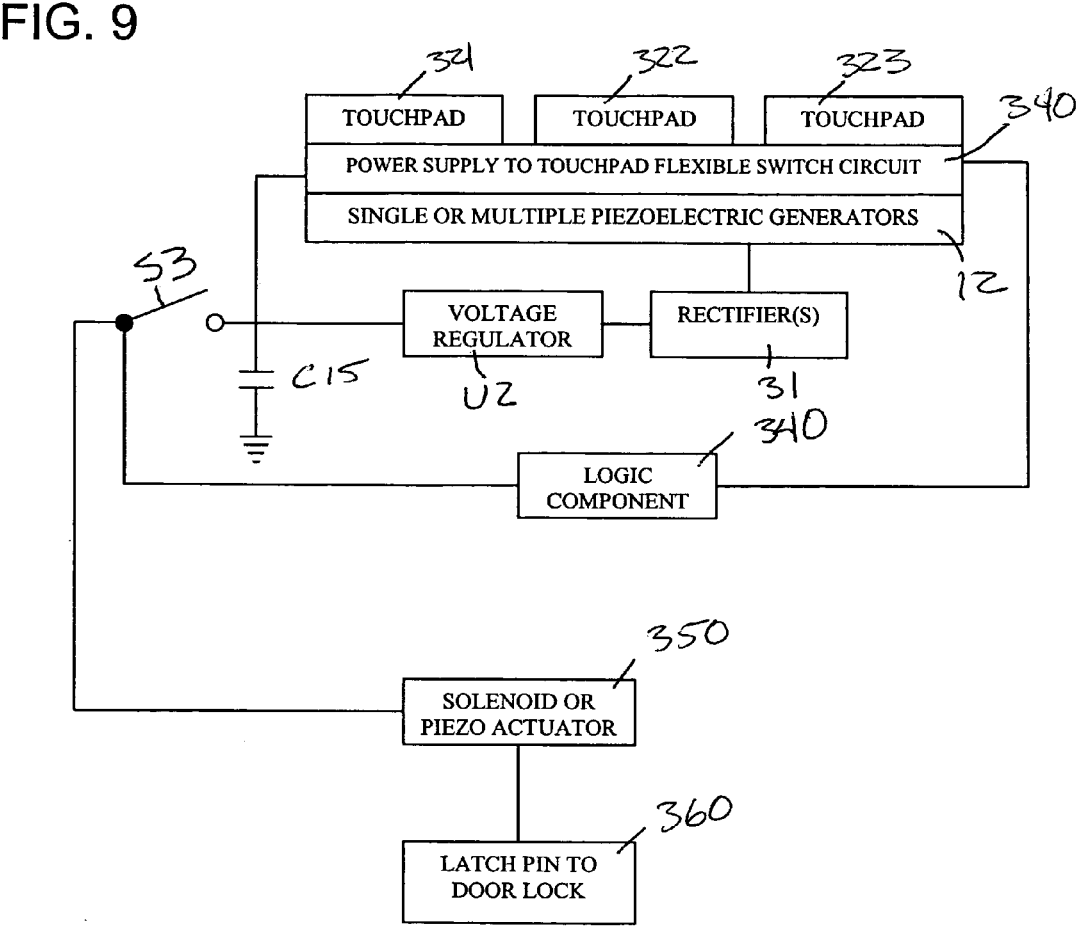
FIG. 9 is a block diagram showing the components of a device for using the electrical signal generated by the device of FIG. 4 or 5 to activate a release pin for a door lock.
Figure 10:
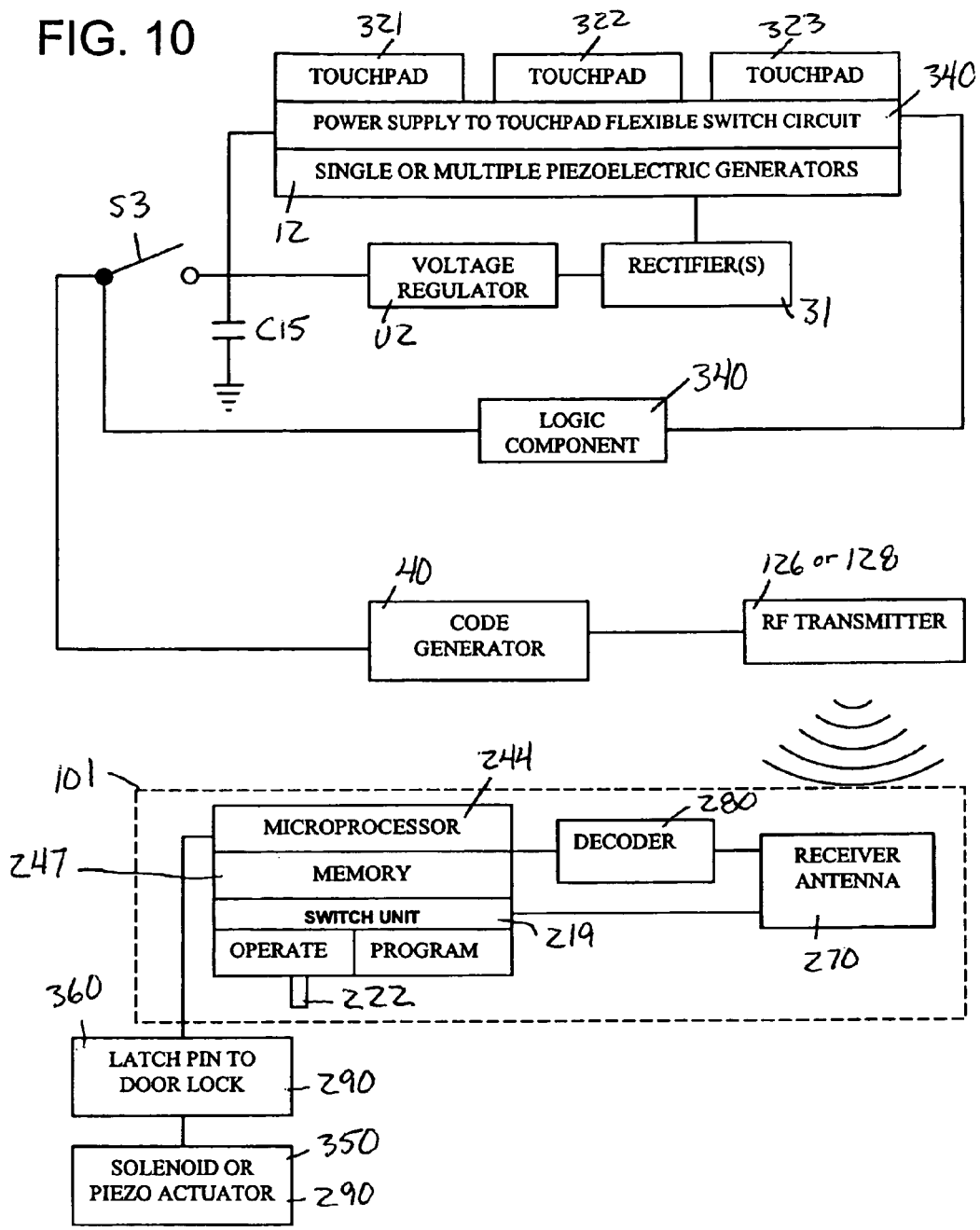
FIG. 10 is a block diagram showing the components of a device for using the electrical signal generated by the device of FIG. 4 or 5 to activate a transmitter for sending a coded signal to activate a release pin for a door lock.
Figure 16:
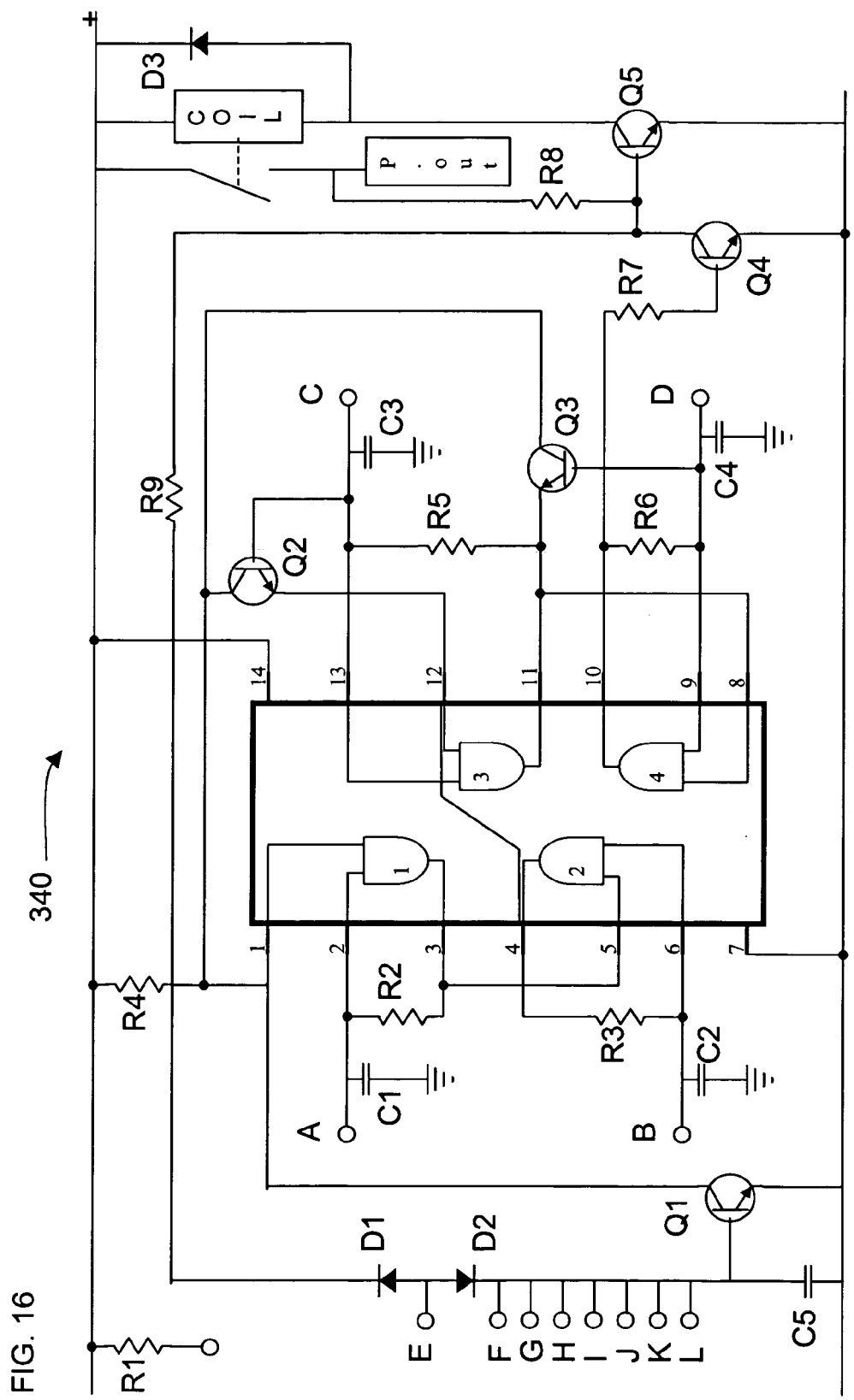
FIG. 16 Is a schematic of an exemplary circuit for entry of a sequencial digital code.

Referring to FIGS. 9–10 and 16: FIG. 16 shows an exemplary circuit for a keypad to register successive button entries for a coded entry system. Input power to the circuit is provided by the output of the voltage regulator. When an acceptable code is entered into the self powered keypad, the keypad circuit or logic component sends an actuation signal to a switching device (such as a transistor) located between the storage device (capacitor or rechargeable battery) and the entry mechanism or other switching device. The switching device is normally in the open position when no code or the wrong code has been entered. After the correct code is entered the logic component sends a signal to the switching device to close. This allows the capacitor/battery to discharge through the switch to the entry mechanism.

The keypad logic circuit 340 components comprise an IC which is a quad 2 input "AND" gate, such as a CMOS 4081. These gates only produce a HIGH output, when BOTH the inputs are HIGH. When the key wired to 'E' is pressed, current through R1 and D1 switches Q5 on. The relay energizes; and Q5 is latched on' by R8. Thus, the alarm is set by pressing a single key, say one of the two non-numeric symbols.

The circuit will switch off when the 4 keys connected to "A,B,C,D" are pushed in the right order. The circuit works because each gate 'Stands' upon its predecessor. If any key other than the correct key is pushed, then gate 1 is knocked out of the stack, and the code entry fails. Pin 1 is held high by R4. This 'Enables' gate 1; and when button 'A' is pressed, the output at pin 3 will go high. This output does two jobs. It locks itself 'ON' through R2 and it 'Enables' gate 2, by taking pin 5, high. Now, if 'B' is pressed, the output of gate 2, at pin 4 will go high. This output does two jobs. It locks itself 'ON' through R3 and it 'Enables' gate 3 by taking pin 12 high.

Now, if 'C' is pressed, the output of gate 3 will lock itself 'ON' through R5 and, by taking pin 8 high, 'Enable' gate 4. Pressing 'D' causes gate 4 to do the same thing; only this time its output, at pin 10, turns Q4 'ON'. This takes the base of Q5 to ground, switching it off and letting the relay drop out.

Any keys not connected to 'A B C D E' are wired to the base of Q1. Whenever 'E' or one of these other keys is pressed, pin 1 is taken low and the circuit is reset. In addition, if 'C' or 'D' is pressed out of sequence, then Q2 or Q3 will take pin 1 low and the circuit will reset. Thus nothing happens until 'A' is pressed. Then if any key other than 'B' is pressed, the circuit will reset. Similarly, after 'B', if any key other than 'C' is pressed, the circuit will reset. The same reasoning also applies to 'D'. The Keypad needs to be the kind with a common terminal and a separate connection to each key. On a 12 key pad, look for 13 terminals. The matrix type with 7 terminals will NOT do. Wire the common to R1 and your chosen code to 'A B C D'. Wire 'E' to the key you want to use to switch the alarm on. All the rest go to the base of Q1.

The diagram of FIG. 16 provides a guide to the layout of the components, if using a stripboard. The code can be chosen to include the non-numeric symbols. The number of combinations of codes available is in excess of 10 000 with a 12 key pad. If a more secure code desired, one can add another 4081 and continue the process of enabling subsequent gates. Also one may simply use a bigger keypad with more "WRONG" keys. It is required that the 4k7 resistors protect the junctions while providing enough current to turn the transistors fully on. Capacitors (C1 C2 C3 C4 C5) are there to slow response time and overcome any contact bounce.

Referring to FIG. 9: The entry mechanism comprises a latch pin which maintains the locking mechanism in a normally locked configuration. An electrical signal activates an electromechanical device which remove the latch pi from the lock, allowing the door to be opened. In the simplest embodiment of the invention, the electrical energy discharged from the capacitor is connected to a solenoid. In response to an electrical signal through the coils of the solenoid, the core of the solenoid moves through the center of the coils, pulling the attached latch pin out of the locking mechanism. As an alternative to a solenoid, the electromechanical device may also include one or more additional piezoelectric actuator(s) which bend/contract in response to the electrical discharge from the capacitor. When the piezoelectric element deforms it pulls the attached latch pin out of the locking mechanism.

For extra security these systems may turn off and sound a local alarm after a preset number of wrong combinations. One can put a temporary code in for a baby-sitter or house-keeper and then erase it all by yourself right at the keypad. One can control an electric garage door and unlike the very cheap keypads being sold through the home centers, with this keypad one can have a high security locking system that can't be opened. One can have more than one combination so each person will have a unique code. When controlling an electric lock or strike the relay can be set so it's timed to open or close for a pre-determined period. This is called a momentary closure of the relay. Most keypads can also be set for latching, which means that when the correct code is entered, the relay will fire (open or close). It will remain that way until the code is entered again. With the master code one can erase and add new codes any time. You can hook up more than one unit to control a lock such as one on the outside and one on the inside similar to a double cylinder lock.

Some of these keypads are actually part of a two piece system in that the keypad is attached to a separate small box that contains the electronics. These two part systems are inherently more secure because the box is installed inside in a secure are. The two part systems will specify this. Some applications require a special output format know as Wiegand. The Wiegand output is different from the output of most keypads. Most keypads are made to open or close a relay to activate a lock. A Weigand format keypad will instead produce a certain voltage pattern that will be recognized by the systems electronics. Many of these keypads can also be ordered in the Wiegand format and in addition a very secure 26 bit format, at about the same price as regular keypads.

Figure 14:
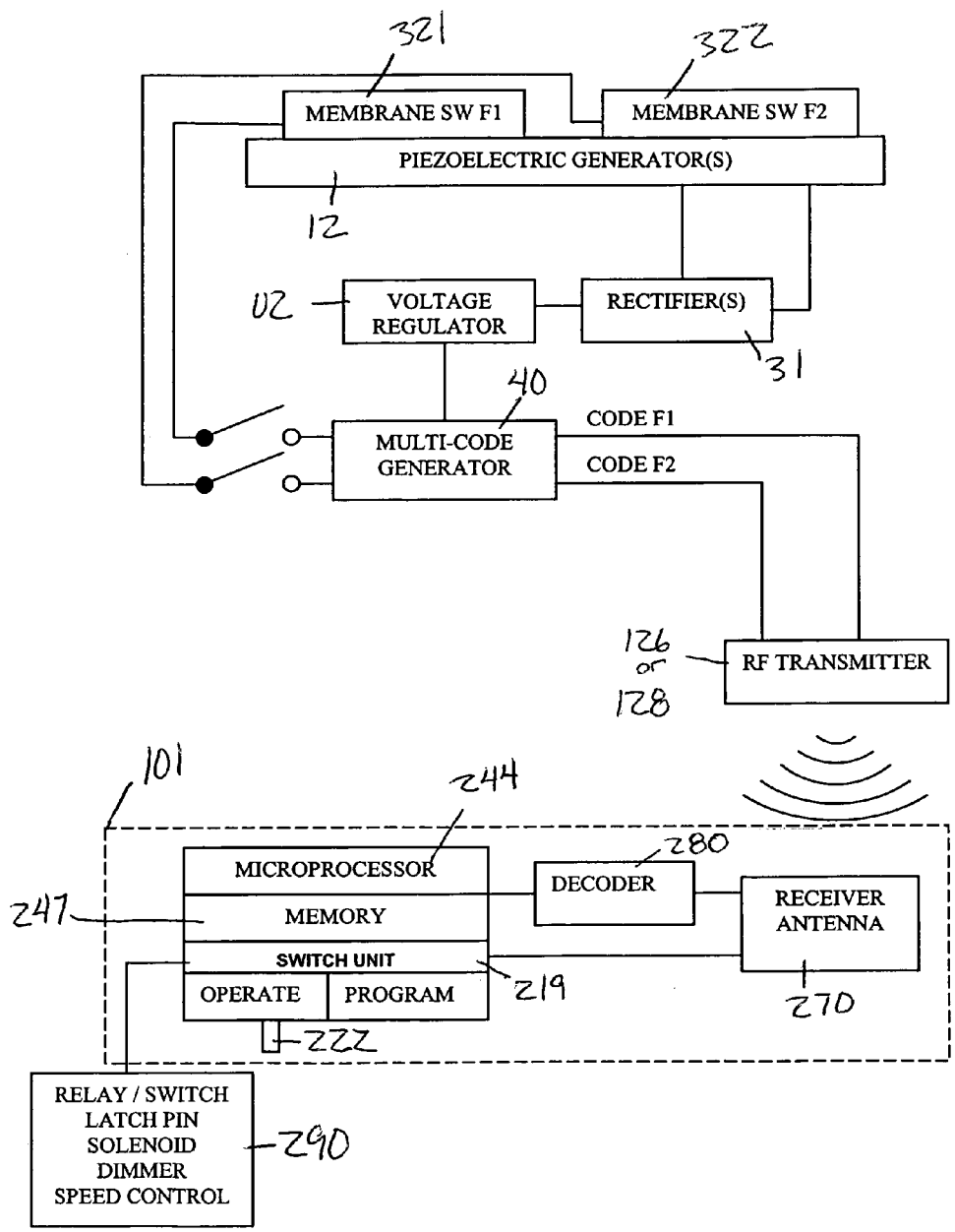
FIG. 14 is a block diagram showing the components of a device for using the electrical signal generated by the device of FIGS. 11a–c and 12–13 to activate a transmitter for sending one or more coded signals to activate a switching device.
Figure 15:
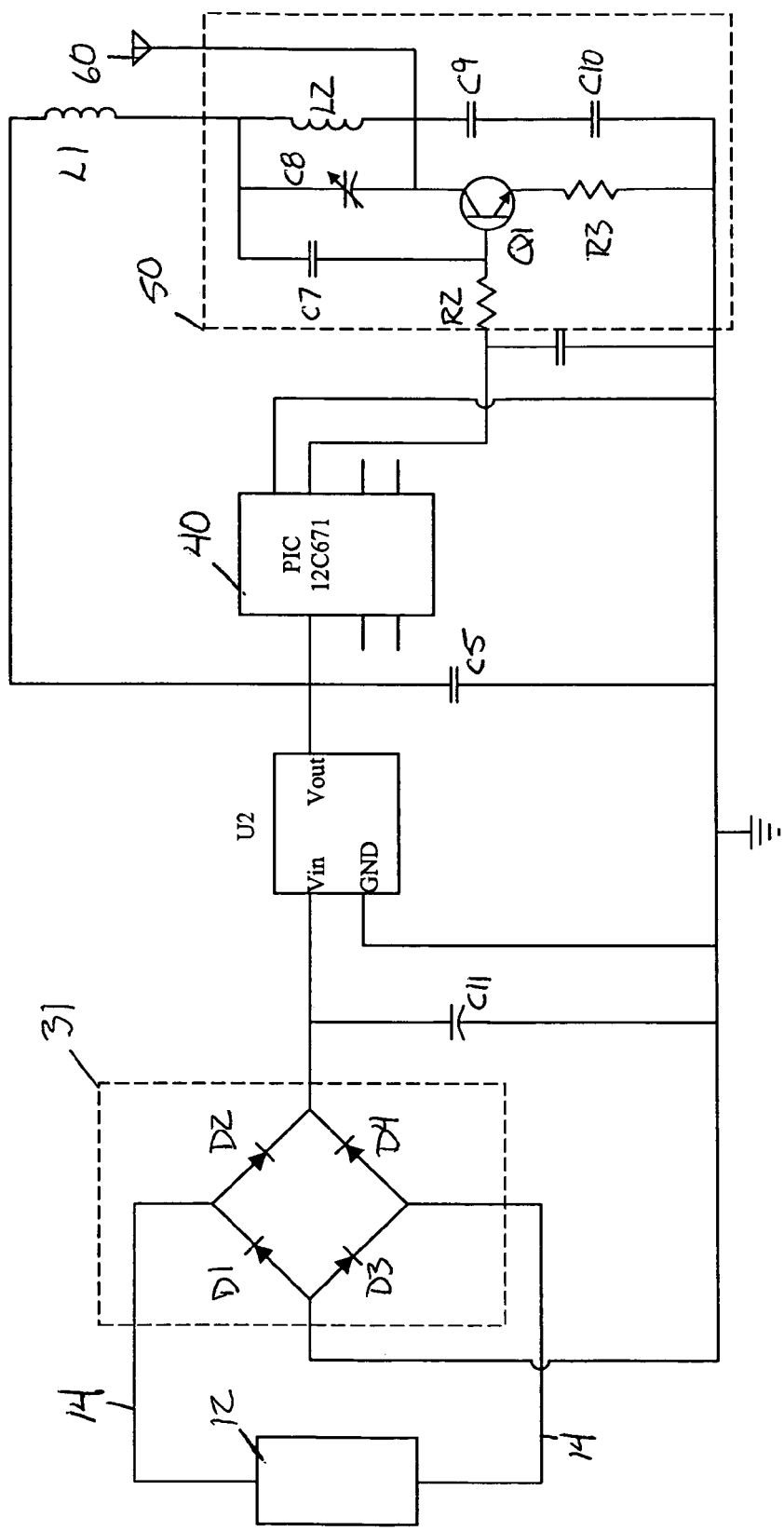
FIG. 15 is a schematic of an exemplary transmitter circuit powered by the piezoelectric element for sending a coded signal to a receiver to activate switching device.

Referring now to FIGS. 10, and 14–15: The electrical energy from the capacitor C15 may also be used to energize an RF transmission circuit as in FIG. 15. The RF transmitter transmits a coded RF signal to a receiver, which uses compares the coded signal to those codes stored in the memory. If a correct code is received the microcomputer then sends a signal to the solenoid or piezo-element to remove the latch pin. The RF transmission circuit and receiver modules are described in further detail below.

RF Transmission Circuit

Referring again to FIGS. 9–10, 12–13 and 14–15: The output of the voltage regulator U2 is preferably used to power an encoder 40 or tone generator comprising a programmable interface controller (PIC) microcontroller that generates a pulsed tone. This pulsed tone or code modulates an RF generator section 50 which radiates an RF signal using a tuned loop antenna 60. The signal radiated by the loop antenna is intercepted by an RF receiver 270 and a decoder 280 which generates a relay pulse to activate the relay 290.

The output of the voltage regulator U2 is connected to a PIC microcontroller, which acts as an encoder 40 for the electrical output signal of the regulator U2. More specifically, the output conductor for the output voltage signal (usually 3.3 volts, but can range from 1.7–5.0 volts) is connected to the input pin of the programmable encoder 40. Types of register-based PIC microcontrollers include the eight-pin PIC12C5XX and PIC12C67x, baseline PIC16C5X, midrange PIC16CXX and the high-end PIC17CXX/PIC18CXX. These controllers employ a modified Harvard, RISC architecture that support various-width instruction words. The datapaths are 8 bits wide, and the instruction widths are 12 bits wide for the PIC16C5X/PIC12C5XX, 14 bits wide for the PIC12C67X/PIC16CXX, and 16 bits wide for the PIC17CXX/PIC18CXX. PICMICROS are available with one-time programmable EPROM, flash and mask ROM. The PIC17CXX/PIC18CXX support external memory. The encoder 40 comprises for example a PIC model 12C671. The PIC12C6XX products feature a 14-bit instruction set, small package footprints, low operating voltage of 2.5 volts, interrupts handling, internal oscillator, on-board EEPROM data memory and a deep stack. The PIC12C671 is a CMOS microcontroller programmable with 35 single word instructions and contains 1024×14 words of program memory, and 128 bytes of user RAM with 10 MHz maximum speed. The PIC12C671 features an 8-level deep hardware stack, 2 digital timers (8-bit TMR0 and a Watchdog timer), and a four-channel, 8-bit A/D converter.

The output of the PIC may include square, sine or saw waves or any of a variety of other programmable waveforms. Typically, the output of the encoder 40 is a series of binary square waveforms (pulses) oscillating between 0 and a positive voltage, preferably +3.3 VDC. The duration of each pulse (pulse width) is determined by the programming of the encoder 40. The duration of the complete waveform is determined by the duration of output voltage pulse of the voltage regulator U2. A capacitor C5 is preferably be connected on one end to the output of the voltage regulator U2, and on the other end to ground to act as a filter between the voltage regulator U2 and the encoder 40.

Thus, the use of an IC as a tone generator or encoder 40 allows the encoder 40 to be programmed with a variety of values. The encoder 40 is capable of generating a multiplicity of unique encoded signals by simply varying the programming for the output of the encoder 40. More specifically, the encoder 40 can generate any one of a billion or more possible codes. It is also possible and desirable to have more than one encoder 40 included in the circuit in order to generate more than one code from one actuator or transmitter. Alternately, any combination of multiple actuators and multiple pulse modification subcircuits may be used together to generate a variety of unique encoded signals. Alternately the encoder 40 may comprise one or more inverters forming a series circuit with a resistor and capacitor, the output of which is a square wave having a frequency determined by the RC constant of the encoder 40.

Figure 12:
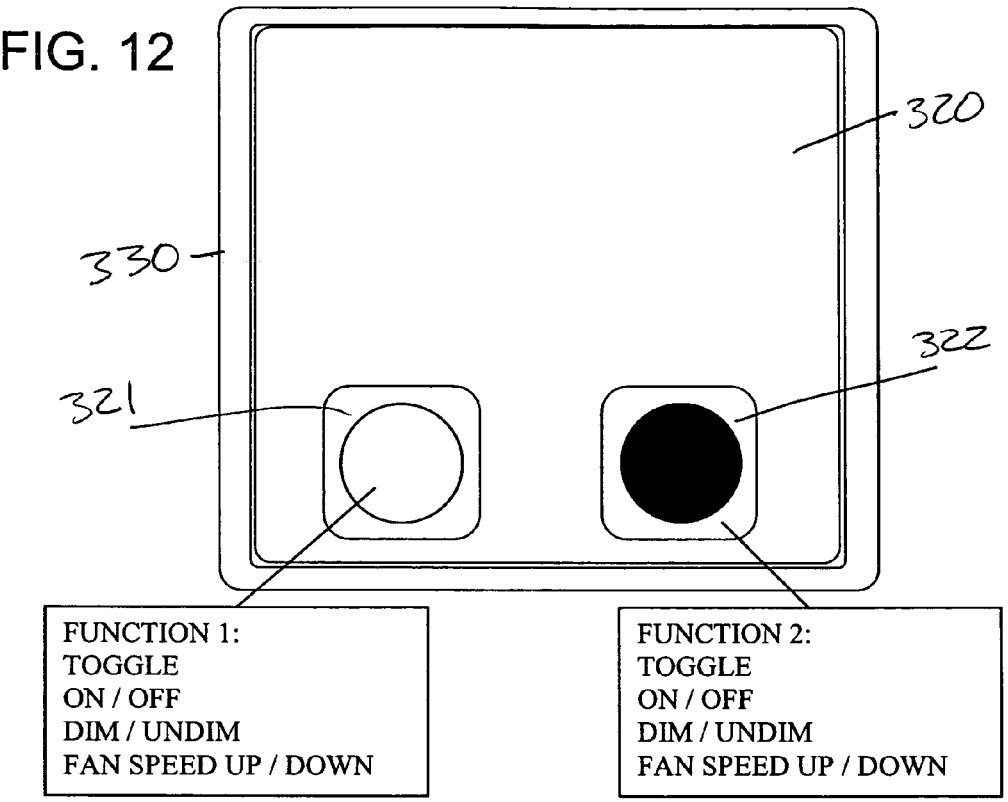
FIG. 12 is a plan view of a face plate and switch housing having two membrane switches thereon for direct connection to a transmitter circuit to provide separate functions.
Figure 13:
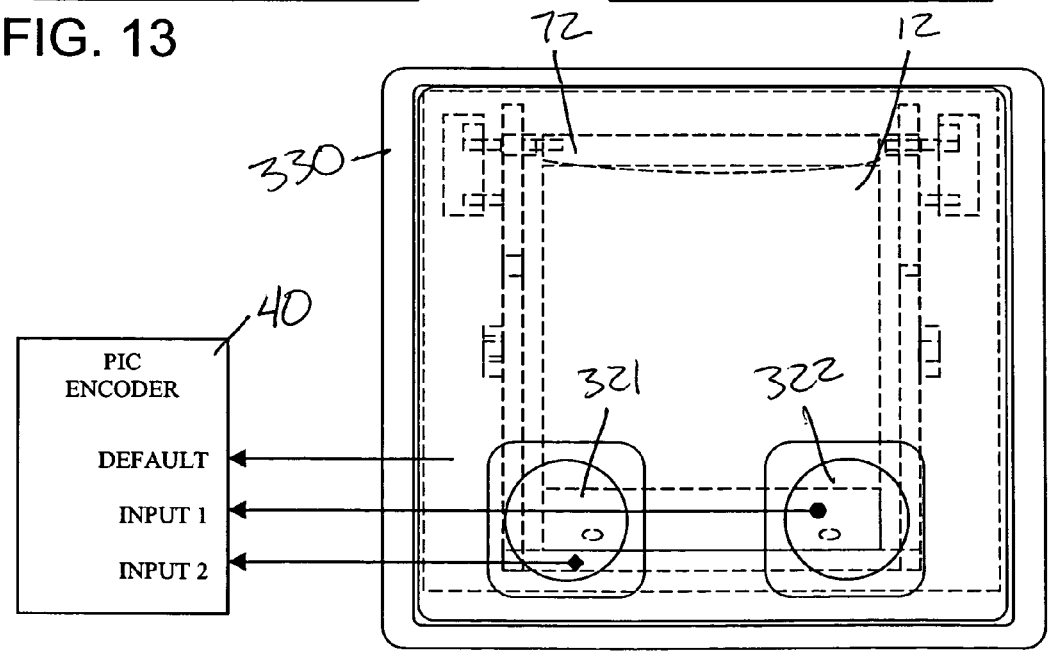
FIG. 13 is a plan view of the face plate and switch housing of FIG. 12 showing a deflection assembly and piezoelectric generator in ghost therein.

Referring to FIGS. 12–14: The encoder 40 is programmable to generate a different code, dependent upon which of the multiple input connections is energized. The DC output of the voltage regulator U2 and the coded output of the encoder 40 are connected to an RF generator 50 via one or more membrane switches 321, 322, 323 on the keypad 320 or faceplate/deflector 72. When a membrane switch 321, 322, 323 is pressed, it creates electrical contact between the output of the voltage regulator U2 and one of the input pins to the PIC encoder 40. The encoder 40 output signal (code) is dependent upon which input pin has the voltage applied thereto. That is to say, the output signal or code is dependent upon and different for each pin energized by the respective membrane switch that is pressed/closed. For example, when the mechanical deflector is pressed (but not a membrane switch 321 or 322), the encoder is energized and sends a default code to the RF transmitter. However, when a membrane switch 321 depressed, it creates electrical contact from the voltage regulator U2 to a different pin of the encoder 40, thus changing the output of the encoder to a different code from the default code. Likewise, when a different witch 322 depressed, it creates electrical contact from the voltage regulator U2 to a yet another pin of the encoder 40, thus changing the output of the encoder to a third different code from the default code and second codes. These codes can correspond to a variety of functions for electrical appliances that receive the transmitted code such as a light switch, a dimmer, an electrical appliance power source, a security system, a motor controller, a solenoid, a piezoelectric transducer and a latching pin for a locking system. Exemplary functions that are associated with the membrane switches and concomitant coded outputs of the encoder 40 include "TOGGLE", "ON", "OFF", "DIM", "UNDIM/

BRIGHTEN", "LOCK", "UNLOCK", "SPEED UP", "SLOW DOWN", "ACTIVATE", "RESET" or the like command functions for electrical appliances connected to the receiver.

A capacitor C6 may preferably be connected on one end to the output of the encoder 40, and on the other end to ground to act as a filter between the encoder 40 and the RF generator 50. The RF generator 50 consists of tank circuit connected to the encoder 40 and voltage regulator U2 through both a bipolar junction transistor (BJT) Q1 and an RF choke. More specifically, the tank circuit consists of a resonant circuit comprising an inductor L2 and a capacitor C8 connected to each other at each of their respective ends (in parallel). Either the capacitor C8 or the inductor L2 or both may be tunable in order to adjust the frequency of the tank circuit. An inductor L1 acts as an RF choke, with one end of the inductor L1 connected to the output of the voltage regulator U2 and the opposite end of the inductor L1 connected to a first junction of the L2-C8 tank circuit. Preferably, the RF choke inductor L1 is an inductor with a diameter of approximately 0.125 inches and turns on the order of thirty and is connected on a loop of the tank circuit inductor L2. The second and opposite junction of the L2-C8 tank circuit is connected to the collector of BJT Q1. The base of the BJT Q1 is also connected through resistor R2 to the output side of the encoder 40. A capacitor C7 is connected to the base of a BJT Q1 and to the first junction of the tank circuit. Another capacitor C9 is connected in parallel with the collector and emitter of the BJT Q1. This capacitor C9 improves the feedback characteristics of the tank circuit. The emitter of the BJT Q1 is connected through a resistor R3 to ground. The emitter of the BJT Q1 is also connected to ground through capacitor C10 which is in parallel with the resistor R3. The capacitor C10 in parallel with the resistor R4 provides a more stable conduction path from the emitter at high frequencies.

Referring now to FIGS. 10 and 14–15: The RF generator 50 works in conjunction with a tuned loop antenna 60. In the preferred embodiment, the inductor L2 of the tank circuit serves as the loop antenna 60. More preferably, the inductor/loop antenna L2 comprises a single rectangular loop of copper wire having an additional smaller loop or jumper 61 connected to the rectangular loop L2. Adjustment of the shape and angle of the smaller loop 61 relative to the rectangular loop L2 is used to increase or decrease the apparent diameter of the inductor L2 and thus tunes the RF transmission frequency of the RF generator 50. In an alternate embodiment, a separate tuned antenna may be connected to the second junction of the tank circuit.

In operation: The positive voltage output from the voltage regulator U2 is connected the encoder 40 via a default pin and to one or more different pins through one or more respective membrane switches 321, 322, 32333. The positive voltage output from the voltage regulator U2 is also connected the RF choke inductor L1. The voltage drives the encoder 40 to generate a coded square wave output (which code depends on the pin energized), which is connected to the base of the BJT Q1 through resistor R2. When the coded square wave voltage is zero, the base of the BJT Q1 remains de-energized, and current does not flow through the inductor L1. When the coded square wave voltage is positive, the base of the BJT Q1 is energized through resistor R2. With the base of the BJT Q1 energized, current is allowed to flow across the base from the collector to the emitter and current is also allowed to flow across the inductor L1. When the square wave returns to a zero voltage, the base of the BJT Q1 is again de-energized.

When current flows across the choke inductor L1, the tank circuit capacitor C8 charges. Once the tank circuit capacitor C8 is charged, the tank circuit begins to resonate at the frequency determined by the circuit's LC constant. For example, a tank circuit having a 7 picofarad capacitor and an inductor L2 having a single rectangular loop measuring 0.7 inch by 0.3 inch, the resonant frequency of the tank circuit is 310 MHz. The choke inductor L1 prevents RF leakage into upstream components of the circuit (the PIC) because changing the magnetic field of the choke inductor L1 produces an electric field opposing upstream current flow from the tank circuit. To produce an RF signal, charges have to oscillate with frequencies in the RF range. Thus, the charges oscillating in the tank circuit inductor/tuned loop antenna L2 produce an RF signal of preferably 310 MHz. As the square wave output of the inverter turns the BJT Q1 on and off, the signal generated from the loop antenna 60 comprises a pulsed RF signal having a duration of 100–250 milliseconds and a pulse width determined by the encoder 40, (typically of the order of 0.1 to 5.0 milliseconds thus producing 20 to 2500 pulses at an RF frequency of approximately 310 MHz. The RF generator section 50 is tunable to multiple frequencies. Therefore, not only is the transmitter capable of a great number of unique codes, it is also capable of generating each of these codes at a different frequency, which greatly increases the number of possible combinations of unique frequency-code signals.

The RF generator 50 and antenna 60 work in conjunction with an RF receiver 270. More specifically, an RF receiver 270 in proximity to the RF transmitter 60 (within 300 feet) can receive the pulsed RF signal transmitted by the RF generator 50. The RF receiver 270 comprises a receiving antenna 270 for intercepting the pulsed RF signal (tone or code). The tone generates a pulsed electrical signal in the receiving antenna 270 that is input to a microprocessor chip that acts as a decoder 280. The decoder 280 filters out all signals except for the RF signal it is programmed to receive, e.g., the signal generated by the RF generator 50. An external power source is also connected to the microprocessor chip/decoder 280. In response to the intercepted code from the RF generator 50, the decoder chip produces a pulsed electrical signal. The external power source connected to the decoder 280 augments the pulsed voltage output signal developed by the chip. This augmented (e.g., 120 VAC) voltage pulse is then applied to a conventional relay 290 for changing the position of a switch within the relay. Changing the relay switch position is then used to turn an electrical device with a bipolar switch on or off, or toggle between the several positions of a multiple position switch. Zero voltage switching elements may be added to ensure the relay 290 activates only once for each depression and recovery cycle of the flextensional transducer element 12.

Switch Initiator System with Trainable Receiver

Several different RF transmitters may be used that generate different codes for controlling relays that are tuned to receive that code. In another embodiment, digitized RF signals may be coded and programmable (as with a garage door opener) to only activate a relay that is coded with that digitized RF signal. In other words, the RF transmitter is capable of generating at least one code, but is preferably capable of generating multiple codes. Most preferably, each transmitter is programmed with one or more unique coded signals. This is easily done, since programmable ICs for generating the code can have over $2^{30}$ possible unique signal codes which is the equivalent of over 1 billion codes. Most preferably the invention comprises a system of multiple transmitters and one or more receivers for actuating building lights, appliances, security systems and the like. In this system for remote control of these devices, an extremely large number of codes are available for the transmitters for operating the lights, appliances and/or systems and each transmitter has at least one unique, permanent and nonuser changeable code. The receiver and controller module at the lights, appliances and/or systems is capable of storing and remembering a number of different codes corresponding to different transmitters (or different function buttons/membrane switches on a single transmitter) such that the controller can be programmed so as to actuated by more than one transmitted code, thus allowing two or more transmitters to actuate the same light, appliance and/or system.

The remote control system includes a receiver/controller for learning a unique code or code of a remote transmitter to cause the performance of a function associated with the system, light or appliance with which the receiver/controller module is associated. The remote control system is advantageously used, in one embodiment, for interior or exterior lighting, household appliances or security system. Preferably, a plurality of transmitters is provided wherein each transmitter has at least one unique and permanent non-user changeable code and wherein the receiver can be placed into a program mode wherein it will receive and store two or more codes corresponding to two or more different transmitters. The number of codes which can be stored in transmitters can be extremely high as, for example, greater than one billion codes. The receiver has a decoder module therein which is capable of learning many different transmitted codes, which eliminates code switches in the receiver and also provides for multiple transmitters for actuating the light or appliance. Thus, the invention makes it possible to eliminate the requirements for code selection switches in the transmitters and receivers.

Referring to FIGS. 10 and 14: The receiver module includes a suitable antenna 270 for receiving radio frequency transmissions from one or more transmitters 126 and 128 and supplies an input to a decoder 280 which provides an output to a microprocessor unit 244. The microprocessor unit 244 is connected to a relay device 290 or controller which switches the light or appliance between one of two or more operation modes, i.e., on, off, dim, or some other mode of operation. A switch 222 is mounted on a switch unit 219 connected to the receiver and also to the microprocessor 244. The switch 222 is a two position switch that can be moved between the "operate" and "program" positions to establish operate and program modes.

In the invention, each transmitter, such as transmitters 126 and 128, has at least one unique code which is determined by the tone generator/encoder 40 contained in the transmitter. The receiver unit 101 is able to memorize and store a number of different transmitter codes which eliminates the need of coding switches in either the transmitter or receiver which are used in the prior art. This also eliminates the requirement that the user match the transmitter and receiver code switches. Preferably, the receiver 101 is capable of receiving many transmitted codes, up to the available amount of memory locations 247 in the microprocessor 244, for example one hundred or more codes.

When the controller 290 for the light or appliance is initially installed, the switch 222 is moved to the program mode and the first transmitter 126 is energized so that the unique code of the transmitter 126 is transmitted. This is received by the receiver module 101 having an antenna 270 and decoded by the decoder 280 and supplied to the microprocessor unit 244. The code of the transmitter 126 is then supplied to the memory address storage 247 and stored therein. Then if the switch 222 is moved to the operate mode and the transmitter 126 energized, the receiver 270, decoder 280 and the microprocessor 244 will compare the received code with the code of the transmitter 126 stored in the first memory location in the memory address storage 247 and since the stored memory address for the transmitter 126 coincides with the transmitted code of the transmitter 126 the microprocessor 244 will energize the controller mechanism 290 for the light or appliance to energize de-energize or otherwise operate the device.

In order to store the code of the second transmitter 128 the switch 222 is moved again to the program mode and the transmitter 128 is energized. This causes the receiver 270 and decoder 280 to decode the transmitted signal and supply it to the microprocessor 244 which then supplies the coded signal of the transmitter 128 to the memory address storage 247 where it is stored in a second address storage location. Then the switch 222 is moved to the operate position and when either of the transmitters 126 and 128 are energized, the receiver 270 decoder 280 and microprocessor 244 will energize the controller mechanism 290 for the light or appliance to energize de-energize or otherwise operate the device. Alternately, the signal from the first transmitter 126 and second transmitter 128 may cause separate and distinct actions to be performed by the controller mechanism 290.

Thus, the codes of the transmitters 126 and 128 are transmitted and stored in the memory address storage 247 during the program mode after which the system, light or appliance controller 290 will respond to either or both of the transmitters 126 and 128. Any desired number of transmitters can be programmed to operate the system, light or appliance up to the available memory locations in the memory address storage 247.

This invention eliminates the requirement that binary switches be set in the transmitter or receiver as is done in systems of the prior art. The invention also allows a controller to respond to a number of different transmitters because the specific codes of a number of the transmitters are stored and retained in the memory address storage 247 of the receiver module 101.

In yet another more specific embodiment of the invention, each transmitter 126 or 128 contains two or more unique codes for controlling a system, light or appliance. One code corresponds in the microprocessor to the "on" position and another code corresponds in the microprocessor 244 to the "off" position of the controller 290. Alternately, the codes may correspond to "more" or "less" respectively in order to raise or lower the volume of a sound device or to dim or undim lighting for example. Lastly, the unique codes in a transmitter 126 or 128 may comprise four codes which the microprocessor interprets as "on", "off", "more" and "less" positions of the controller 290, depending on the desired setup of the switches. Alternatively, a transmitter 126 or 128 may only have two codes, but the microprocessor 244 interprets repeated pushes of "on" or "off" signals respectively to be interpreted as dim up and dim down respectively.

In another embodiment of the invention, receiver modules 101 may be trained to accept the transmitter code(s) in one step. The memory 247 in the microprocessor 244 of the receiver modules 101 will have "slots" where codes can be stored. For instance one slot may be for all of the codes that the memory 247 accepts to be turned on, another slot for all the off codes, another all the 30% dimmed codes, etc.

Each transmitter 126 has a certain set of codes. For example one transmitter may have just one code, a "toggle" code, wherein the receiver module 101 knows only to reverse its current state, if it's on, turn off, and if it's off, turn on. Alternatively, a transmitter 126 may have many codes for the complex control of appliances. Each of these codes is "unique". The transmitter 126 sends out its code set in a way in which the receiver 101 knows in which slots to put each code. Also, with the increased and longer electrical signal that can be generated in the transmitter 126, a single transmission of a code set is achievable even with mechanically produced voltage. As a back-up, if this is not true, and if wireless transmission uses up more electricity than we have available, some sort of temporary wired connection (jumper not shown) between each transmitter and receiver target is possible. Although the disclosed embodiment shows manual or mechanical interaction with the transmitter and receiver to train the receiver, it is yet desirable to put the receiver in reprogram mode with a wireless transmission, for example a "training" code.

In yet another embodiment of the invention, the transmitter 126 may have multiple unique codes and the transmitter randomly selects one of the multitude of possible codes, all of which are programmed into the memory allocation spaces 247 of the microprocessor 244.

In yet another embodiment of the invention, the transmitter 126 signal need not be manually operated or triggered, but may as easily be operated by any manner of mechanical force, i.e., the movement of a window, door, safe, foot sensor, etc. and that a burglar alarm sensor might simultaneously send a signal to the security system and a light in the intruded upon room. Likewise, the transmitter 126 may be combined with other apparatus. For example, a transmitter 126 may be located within a garage door opener which can also turn on one or more lights in the house, when the garage door opens.

Furthermore, the transmitters can talk to a central system or repeater which re-transmits the signals by wire or wireless means to lights and appliances. In this manner, one can have one transmitter/receiver set, or many transmitters interacting with many different receivers, some transmitters talking to one or more receivers and some receivers being controlled by one or more transmitters, thus providing a broad system of interacting systems and wireless transmitters. Also, the transmitters and receivers may have the capacity of interfacing with wired communications like SMARTHOME or BLUETOOTH.

While in the preferred embodiment of the invention, the actuation means has been described as from mechanical to electric, it is within the scope of the invention to include batteries in the transmitter to power or supplement the power of the transmitter. For example, rechargeable batteries may be included in the transmitter circuitry and may be recharged through the electromechanical actuators. These rechargeable batteries may thus provide backup power to the transmitter.

It is seen that the present invention allows a receiving system to respond to one of a plurality of transmitters which have different unique codes which can be stored in the receiver during a program mode. Each time the "program mode switch" 222 is moved to the program position, a different storage can be connected so that the new transmitter code would be stored in that address. After all of the address storage capacity have been used additional codes would erase all old codes in the memory address storage before storing a new one.

This invention is safe because it eliminates the need for 120 VAC (220 VAC in Europe) lines to be run to each switch in the house. Instead the higher voltage overhead AC lines are only run to the appliances or lights, and they are actuated through the self-powered switching device and relay switch.

The invention also saves on initial and renovation construction costs associated with cutting holes and running the electrical lines to/through each switch and within the walls. The invention is particularly useful in historic structures undergoing preservation, as the walls of the structure need not be destroyed and then rebuilt. The invention is also useful in concrete construction, such as structures using concrete slab and/or stucco construction and eliminate the need to have wiring on the surface of the walls and floors of these structures.

While the above description contains many specificities, these should not be construed as limitations on the scope of the invention, but rather as an exemplification of one preferred embodiment thereof. Many other variations are possible, for example:

In addition to piezoelectric devices, the electroactive elements may comprise magnetostrictive or ferroelectric devices;

Rather than being arcuate in shape, the actuators may normally be flat and still be deformable;

Multiple high deformation piezoelectric actuators may be placed, stacked and/or bonded on top of each other;

Multiple piezoelectric actuators may be placed adjacent each other to form an array.

Larger or different shapes of THUNDER elements may also be used to generate higher impulses.

The piezoelectric elements may be flextensional actuators or direct mode piezoelectric actuators.

A bearing material may be disposed between the actuators and the recesses or switch plate in order to reduce friction and wearing of one element against the next or against the frame member of the switch plate.

Other means for applying pressure to the actuator may be used including simple application of manual pressure, rollers, pressure plates, toggles, hinges, knobs, sliders, twisting mechanisms, release latches, spring loaded devices, foot pedals, game consoles, traffic activation and seat activated devices.

I claim:

1. A self-powered multifunction switching system, comprising:
    an electroactive transducer having first and second ends, said electroactive transducer comprising;
        a first electroactive member having opposing first and second electroded major faces and first and second ends;
        a flexible substrate bonded to said second major face of said first electroactive member;
            said flexible substrate having first and second ends adjacent said first and second ends of said first electroactive member;
        wherein said electroactive transducer is adapted to deform from a first position to a second position upon application of a force to said electroactive transducer;
        and wherein said electroactive transducer is adapted to return to said first position from said second position upon release of said force from said electroactive transducer;
        and wherein upon said deformation from said first position to second position, said electroactive transducer generates a first voltage potential between said first electroded major face and said second electroded major face;
        and wherein upon said return from said first position to second position, said electroactive transducer generates a second voltage potential between said first electroded major face and said second electroded major face;
a mounting member for retaining said electroactive transducer,
   said mounting member comprising at least one retaining means adjacent said first end, said second end or said first and second ends of said flexible substrate of said first electroactive member;
mechanical deflection means for application of a force to said electroactive transducer, said mechanical deflection means being adapted to apply a force sufficient to deform said electroactive transducer from said first position to said second position, thereby generating a first voltage potential;
a first conductor electrically connected to said first electroded major face of said first electroactive member;
a second conductor electrically connected to said second electroded major face of said first electroactive member;
at least one mechanically activated switch comprising a third conductor, and fourth conductor and a shorting contact; said at least one mechanically activated switch being mechanical attached to said mechanical deflection means;
   said at least one mechanically activated switch being adapted to electrically connect said third conductor to said fourth conductor with said shorting contact upon pressing said at least one mechanically activated switch and said mechanical deflection means;
a rectifier having an input side and an output side;
   said input side of said rectifier being electrically connected between said first and second conductors in parallel with said first and second electroded major faces of said electroactive transducer;
a voltage regulator having an input side and an output side:
   said input side of said voltage regulator being electrically connected to said output side of said rectifier;
a logic component, said logic component comprising an encoder having an input and an output side, said output side of said voltage regulator being connected to said input side of said encoder;
   said encoder being adapted to generate at least one coded waveform;
   said third and fourth conductors of said at least one mechanically activated switch being connected between said output side of said voltage regulator and said input side of said encoder;
an output signal at said output side of said encoder being an electrical signal having one of said at least one coded waveforms;
first signal transmission means electrically connected to said output side of said encoder;
   said first signal transmission means comprising a first radio frequency generator subcircuit connected to an antenna;
   said radio-frequency generator subcircuit being adapted to generate a first radio-frequency signal modulated by said output signal of said encoder for transmission by said antenna;
signal reception means for receiving a first signal transmitted by said first signal transmission means;
   said signal reception means being adapted to generate a relay signal in response to said first signal transmitted by said first signal transmission means; and
a relay device for operating an electrical device;
   said relay device being in communication with said signal reception means;
   said relay device having a plurality of positions, each of said positions in said plurality of positions corresponding to an operating mode of said electrical device
   said relay device being adapted to change between a first position to a second position in said plurality of positions in response to said relay signal.

2. A self-powered multifunction switching system according to claim 1:
   wherein said encoder is adapted to be programmable to generate at least one coded waveform, said coded waveform being selectable from at least 8-bit combinations of binary codes.

3. A self-powered multifunction switching system according to claim 1:
   wherein upon said deformation and return between said first position and second position, said electroactive transducer is adapted to generate an oscillating electrical potential between said first electroded major face and said second electroded major face of said electroactive transducer.

4. A self-powered multifunction switching system according to claim 1, wherein said first signal reception means further comprises:
   a memory for storage of said at least one coded waveform modulated onto first radio-frequency signal by said encoder.

5. A self-powered switching system according to claim 4, wherein said first signal reception means further comprises:
   comparator means electrically connected to said memory,
      said comparator means being adapted to compare said at least one coded waveform modulated onto said first signal transmitted by said first signal transmission means to said at least one coded waveform stored in said memory;
      said comparator means being adapted to generate said relay signal in response to said first signal transmitted by said first signal transmission means only when said at least one coded waveform modulated onto said first signal matches said at least one coded waveform stored in said memory.

6. A self-powered multifunction switching system according to claim 1:
   wherein said encoder is adapted to generate a first coded waveform upon pressing a first mechanically activated switch;
   and wherein said encoder is adapted to generate a second coded waveform different from said first coded waveform upon pressing a second mechanically activated switch.

7. A self-powered multifunction switching system according to claim 1:
   wherein said encoder is adapted to generate a first coded waveform upon pressing a first mechanically activated switch;
   and wherein said encoder is adapted to generate a second coded waveform different from said first coded waveform upon pressing said mechanical deflection means and not on said first mechanically activated switch.

8. A self-powered multifunction switching system according to claim 1:
   wherein said relay signal is selected from the group of electrical device operation modes comprising: on, off, toggle, dim, brighten, speed up, slow down, lock, unlock, activate and reset.

9. A self-powered multifunction switching system according to claim 8:
   wherein said relay device is selected from the group of electrical device operators comprising: a light switch, a dimmer, an electrical appliance power source, a security system, a motor controller, a solenoid, a piezoelectric transducer and a latching pin for a locking system.

10. A self-powered multifunction switching system, comprising:
   an electroactive transducer having first and second ends, said electroactive transducer comprising;
      a first electroactive member having opposing first and second electroded major faces and first and second ends;
      a flexible substrate bonded to said second major face of said first electroactive member;
         said flexible substrate having first and second ends adjacent said first and
      second ends of said first electroactive member;
      wherein said electroactive transducer is adapted to deform from a first position to a second position upon application of a force to said electroactive transducer;
      and wherein said electroactive transducer is adapted to return to said first position from said second position upon release of said force from said electroactive transducer;
      and wherein upon said deformation from said first position to second position, said electroactive transducer generates a first voltage potential between said first electroded major face and said second electroded major face;
      and wherein upon said return from said first position to second position, said electroactive transducer generates a second voltage potential between said first electroded major face and said second electroded major face;
   a mounting member for retaining said electroactive transducer;
      said mounting member comprising at least one retaining means adjacent said first end, said second end or said first and second ends of said flexible substrate of said first electroactive member,
   mechanical deflection means for application of a force to said electroactive transducer, said mechanical deflection means being adapted to apply a force sufficient to deform said electroactive transducer from said first position to said second position, thereby generating a first voltage potential;
   a first conductor electrically connected to said first electroded major face of said first electroactive member;
   a second conductor electrically connected to said second electroded major face of said first electroactive member;
   a keypad comprising a multiplicity of mechanically activated switches, wherein each of said mechanically activated switches comprises a first switch conductor, and a second switch conductor and a shorting contact;
      said keypad being mechanical attached to said mechanical deflection means;
      each of said mechanically activated switches being adapted to electrically connect said first switch conductor to said second switch conductor with said shorting contact upon pressing said mechanically activated switch and said mechanical deflection means;
   a rectifier having an input side and an output side;
      said input side of said rectifier being electrically connected between said first and second conductors in parallel with said first and second electroded major faces of said electroactive transducer;
   a voltage regulator having an input side and an output side;
      said input side of said voltage regulator being electrically connected to said output side of said rectifier;
   a logic component having a power connection, a multiplicity of input connections and an output side, said output side of said voltage regulator being connected to said power connection of said logic component:
      each of said mechanically activated switches in said multiplicity of mechanically activated switches being electrically connected to a separate input connection in said multiplicity of input connections of said logic component;
      said logic component being adapted to generate a switching signal at said output side in response to the closing of at least one mechanically activated switch connected to an input connection of said logic component:
   a switch having a first side and a second side;
      said first side of said switch being electrically connected to said output side of said voltage regulator;
      said switch being electrically connected to said output side of said logic component;
      said switch being adapted to close upon said generation of said switching signal at said output side of said logic component;
      said keypad being mechanical attached to said mechanical deflection means;
      each of said mechanically activated switches being adapted to electrically connect said first switch conductor to said second switch conductor with said shorting contact upon pressing said mechanically activated switch and said mechanical deflection means;
   a rectifier having an input side and an output side;
      said input side of said rectifier being electrically connected between said first and second conductors in parallel with said first and second electroded major faces of said electroactive transducer;
   a voltage regulator having an input side and an output side;
      said input side of said voltage regulator being electrically connected to said output side of said rectifier;
   a logic component having a power connection, a multiplicity of input connections and an output side, said output side of said voltage regulator being connected to said power connection of said logic component;
      each of said mechanically activated switches in said multiplicity of mechanically activated switches being electrically connected to a separate input connection in said multiplicity of input connections of said logic component;
      said logic component being adapted to generate a switching signal at said output side in response to the closing of at least one mechanically activated switch connected to an input connection of said logic component;

a switch having a first side and a second side;
- said first side of said switch being electrically connected to said output side of said voltage regulator;
- said switch being electrically connected to said output side of said logic component;
- said switch being adapted to close upon said generation of said switching signal at said output side of said logic component;

signal transmission means electrically connected to said second side of said switch;
- said signal transmission means being adapted to generate a first signal in response to said closing of said switch;

a relay device for operating an electrical device;
- said relay device being in communication with said signal transmission means;
- said relay device having a plurality of positions, each of said positions in said plurality of positions corresponding to an operating mode of said electrical device;
- said relay device being adapted to change between a first position to a second position in said plurality of positions in response to said first signal from said signal transmission means.

11. The self-powered multifunction switching system of claim 10, wherein said signal transmission means comprises:
a third electrical conductor connected between said second side of said switch and an input to said relay device.

12. The self-powered multifunction switching system of claim 10, wherein said signal transmission means comprises:

a radio frequency generator subcircuit connected to an antenna;
- said radio-frequency generator subcircuit being adapted to generate a first radio-frequency signal;

signal reception means for receiving a first signal transmitted by said first signal transmission means;
- said signal reception means being adapted to generate a relay signal in response to said first radio frequency signal;
- said signal reception means being electrically connected to said relay device;
- said relay device being adapted to change between a first position to a second position in said plurality of positions in response to said relay signal.

13. The self-powered multifunction switching system of claim 12, wherein said signal transmission means comprises:
an encoder electrically connected between said second side of said switch and an input side of said radio frequency generator subcircuit;
said encoder being adapted to generate a coded output signal;
wherein said radio frequency generator subcircuit is adapted to generate a first radio frequency signal modulated by said output signal of said encoder.

14. The self-powered multifunction switching system of claim 10, wherein said logic component is programmable to generate a switching signal at said output side of said logic component only in response to the closing of at least two mechanically activated switches connected to said input connections of said logic component in a specific sequence programmed into said logic component.

* * * * *